United States Patent
Ahmed et al.

(10) Patent No.: US 12,528,766 B2
(45) Date of Patent: Jan. 20, 2026

(54) HYGROSCOPIC HYDROGELS, METHODS AND USES THEREOF FOR WATER COLLECTION

(71) Applicant: UNIVERSITY OF PRINCE EDWARD ISLAND, Charlottetown (CA)

(72) Inventors: Marya Ahmed, Stratford (CA); Diego Fernando Combita Merchan, Charlottetown (CA)

(73) Assignee: UNIVERSITY OF PRINCE EDWARD ISLAND, Charlottetown (CA)

( * ) Notice: Subject to any disclaimer, the term of this patent is extended or adjusted under 35 U.S.C. 154(b) by 806 days.

(21) Appl. No.: 17/776,254

(22) PCT Filed: Nov. 12, 2019

(86) PCT No.: PCT/CA2019/051610
§ 371 (c)(1),
(2) Date: May 12, 2022

(87) PCT Pub. No.: WO2021/092671
PCT Pub. Date: May 20, 2021

(65) Prior Publication Data
US 2023/0009614 A1    Jan. 12, 2023

(51) Int. Cl.
*C07C 235/10* (2006.01)
*B01D 53/26* (2006.01)
(Continued)

(52) U.S. Cl.
CPC .......... *C07C 235/10* (2013.01); *B01D 53/263* (2013.01); *B01D 53/28* (2013.01);
(Continued)

(58) Field of Classification Search
CPC . C07C 235/10; C08F 220/603; B01D 53/263; B01D 53/28; B01D 2252/2025;
(Continued)

(56) References Cited

FOREIGN PATENT DOCUMENTS

WO    2016/072854 A2    5/2016

OTHER PUBLICATIONS

International Search Report and Written Opinion for corresponding Application No. PCT/CA2019/051610 (mailed Jul. 22, 2020).
(Continued)

*Primary Examiner* — David T Karst
(74) *Attorney, Agent, or Firm* — Troutman Pepper Locke LLP (Rochester)

(57) ABSTRACT

Hygroscopic hydrogels including a cross-linked polymer, the polymer being prepared by polymerization of one or more monomers, wherein at least one of the monomers is a compound of formula I, are provided. Related monomers and polymers, as well as methods for the production and use thereof, are also provided. Hygroscopic hydrogels as described herein may be used for water harvesting, for example. (I) (formula I)

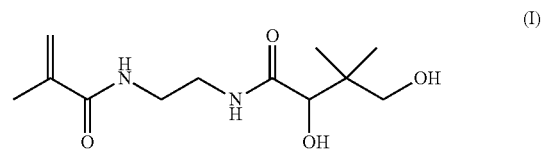

20 Claims, 13 Drawing Sheets

(51) Int. Cl.
  *B01D 53/28* (2006.01)
  *B01J 20/26* (2006.01)
  *B01J 20/34* (2006.01)
  *C08F 220/60* (2006.01)
  *C08J 3/075* (2006.01)

(52) U.S. Cl.
  CPC ......... *B01J 20/267* (2013.01); *B01J 20/3425* (2013.01); *B01J 20/3483* (2013.01); *C08F 220/603* (2020.02); *C08J 3/075* (2013.01); *B01D 2252/2025* (2013.01); *B01J 2220/68* (2013.01); *C08J 2333/24* (2013.01)

(58) Field of Classification Search
  CPC .. B01J 20/267; B01J 20/3425; B01J 20/3483; B01J 2220/68; C08J 3/075; C08J 2333/24
  USPC ........................................................ 528/367
  See application file for complete search history.

(56) References Cited

OTHER PUBLICATIONS

Kabir et al., "Water Recycling Efficacies of Extremely Hygroscopic, Antifouling Hydrogels," RSC Adv. 8:38100-38107 (2018).
Nazeer et al., "Hydrophilic and Salt Responsive Polymers Promote Depletion Aggregation of Bacteria," Europe Polymer J. 119:148-154 (2019).
Garcia-Garcia et al., "Swelling Control in Thermo-Responsive Hydrogels Based on 2-(2-methoxyethoxy)ethyl Methacrylate by Crosslinking and Copolymerization with N-isopropylacrylamide," Polymer J. 43:887-892 (2011).

B5AMA Hydrogel

∿∿∿ = Bis

HYGROSCOPIC HYDROGELS, METHODS AND USES THEREOF FOR WATER COLLECTION

This application is a national stage application under 35 U.S.C. § 371 of International Application No. PCT/CA2019/051610, filed Nov. 12, 2019.

FIELD OF INVENTION

The present invention relates generally to monomers, polymers, and hydrogels. More specifically, the present invention relates to hygroscopic hydrogels for water harvesting.

BACKGROUND OF THE INVENTION

The development of materials with water absorption and storage capabilities in well-defined three-dimensional architectures, is a topic of interest in material science, nanotechnology, biomedicine, agriculture, and in food industry.[1-9] Superabsorbent hydrogels are an example of highly permeable, and biocompatible, three-dimensional network of polymeric materials, capable of holding large amount of water in comparison to their own molecular weight.[2-7] Water releasing hydrogels are an example of a specialized class of superabsorbent hydrogels, and may exhibit superior water absorbing and release efficacies, in the presence of external stimulus, such as temperature.[4-7]

These water releasing hydrogels, capable of harvesting clean water from rivers, mist, dew, fog and dry air, are generally comprised of hygroscopic natural polysaccharides in the presence of organic salts or are cross-linked in the presence of stimuli responsive polymer chains to aid the release of water at high temperatures.[1-8] For example, Miyata and coworkers have recently reported that interpenetrating network of hydrogels of moisture absorbing alginate and thermoresponsive poly N-isopropylacrylamide (PNIPAM) exhibit excellent moisture capturing efficacies and water release due to the collapse of polymeric chains above the lower critical solution temperature (LCST) of PNIPAM.[7] Kallenberger et al. also utilized hygroscopic salts in alginate matrix to harvest the moisture from air and the release of water upon drying.[6] Ohno and coworkers, reported that reasonable hydrophobicity of organic salts can be optimized to develop synthetic hydrogels with reversible water absorption/desorption efficacies as a function of temperature.[5]

There is a need in the art for water-collecting hydrogels, particularly those that can release water at sub-boiling temperatures and can be re-used after drying. Hydrogels with antifouling properties are also desired.

Alternative, additional, and/or improved hygroscopic hydrogels, monomers and polymers relating thereto, and/or methods for the production and/or use thereof, are desired.

SUMMARY OF THE INVENTION

Provided herein are hygroscopic hydrogels, monomers and polymers relating thereto, and methods for the production and/or use thereof, particularly in water harvesting. Using a monomer derivative relating to vitamin B5, referred to herein as B5AMA, hygroscopic hydrogels have now been prepared and identified as having desirable water harvesting properties, which may include an ability to collect water, and release collected water upon a relatively mild increase in temperature. In studies described in detail herein, repeated water collection and release cycles were successfully performed. Several particularly effective hydrogels, as well as monomers and methods for the production thereof, have now been developed, as described in detail hereinbelow. Such hydrogels may be of use in a wide variety of applications where water collection and/or release is desired, such as but not limited to the agriculture, biotechnology, and/or biosensor industries.

In an embodiment, there is provided herein a compound of formula I:

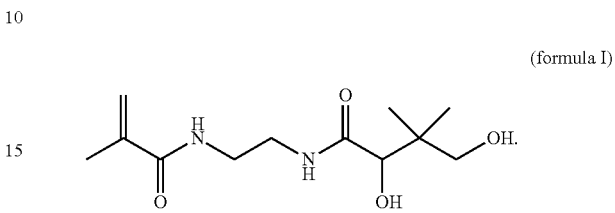

(formula I)

In another embodiment of the above compound, the compound may be the R enantiomer, S enantiomer, or any mixture thereof.

In yet another embodiment of the above compound or compounds, the compound may be:

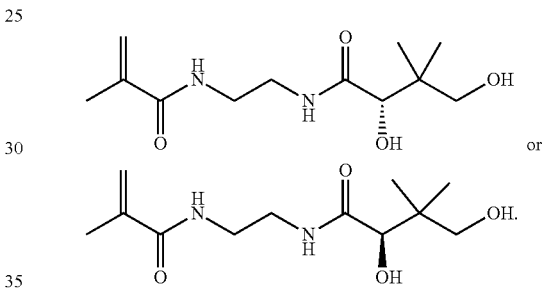

or

In still another embodiment of the above compound or compounds, the compound may be B5AMA:

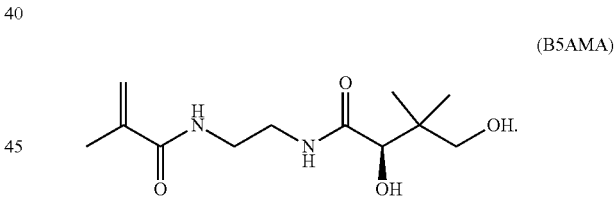

(B5AMA)

In another embodiment, there is provided herein a polymer prepared by polymerization of one or more monomers, wherein at least one of the monomers is any of the compound or compounds as defined above.

In another embodiment of the above polymer, the polymer may be a homopolymer, or a co-polymer.

In still another embodiment of any of the above polymer or polymers, the one or more monomers may be polymerized by free radical polymerization in the presence of an initiator and a catalyst.

In yet another embodiment of any of the above polymer or polymers, the initiator maybe KPS, the catalyst may be TEMEDA, or both.

In another embodiment of any of the above polymer or polymers, the polymer may be cross-linked.

In still another embodiment of any of the above polymer or polymers, the polymer may be cross-linked by free radical polymerization of the one or more monomers in the presence of one or more cross-linkers.

In yet another embodiment of any of the above polymer or polymers, the polymer may be cross-linked with any one or more of the following cross-linkers:

ethylene glycol dimethacrylate poly(ethylene glycol) dimethacrylate triethylene glycol dimethacrylate allyl disulfide or 1,6-hexanediol dimethacrylate or any combinations thereof.

In another embodiment of any of the above polymer or polymers, the cross-linker may be N,N'-methylenebisacrylamide (Bis) cross-linker.

In yet another embodiment of any of the above polymer or polymers, at least one of the monomers may be:

(B5AMA)

In another embodiment of any of the above polymer or polymers, the polymer may be prepared by polymerization of two or more monomers.

In another embodiment of any of the above polymer or polymers, at least one of the monomers may be any one or more of N-vinyl caprolactam 2-hydroxyethyl methacrylate diacetone acrylamide di-(ethylene glycol)methyl ether methacrylate or poly(ethylene glycol) methacrylate or any combinations thereof.

In another embodiment of any of the above polymer or polymers, a molar ratio of the other monomer or monomers to the monomer which is the compound of formula I is a value within a range of about 0.02 to about 2.

In yet another embodiment of any of the above polymer or polymers, at least one of the monomers may be di-(ethylene glycol)methyl ether methacrylate (DEGMEM).

In still another embodiment of any of the above polymer or polymers, the polymer may be a co-polymer of DEGMEM and B5AMA monomers.

In yet another embodiment of any of the above polymer or polymers, a molar ratio of DEGMEM monomer to B5AMA monomer (DEGMEM/B5AMA) in the polymer may be a value within a range of about 1.1 to 1.5.

In still another embodiment of any of the above polymer or polymers, the molar ratio of DEGMEM monomer to B5AMA monomer (DEGMEM/B5AMA) in the polymer is about 1.37.

In another embodiment of any of the above polymer or polymers, the polymer may be prepared by free radical polymerization in the presence of one or more cross-linkers, one or more initiators, and one or more catalysts.

In still another embodiment of any of the above polymer or polymers, the cross-linker may be N',N'-methylene bisacrylamide (BIS), the initiator may be potassium persulfate, the catalyst may be TEMEDA, or any combinations thereof.

In yet another embodiment of any of the above polymer or polymers, polymerization may be in the presence of the cross-linker at about 10 mol %, the initiator at about 10 mol %, the catalyst at about 33 mol %, or any combinations thereof.

In another embodiment, there is provided herein a hygroscopic hydrogel comprising a cross-linked polymer, the polymer being prepared by polymerization of one or more monomers, wherein at least one of the monomers is a compound of formula I:

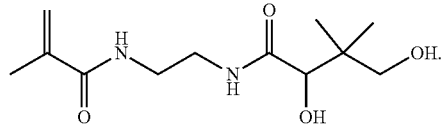

(formula I)

In another embodiment of the above hygroscopic hydrogel, the compound of formula I may be the R enantiomer, the S enantiomer, or any mixture thereof.

In yet another embodiment of any of the above hygroscopic hydrogel or hydrogels, the compound of formula I may be:

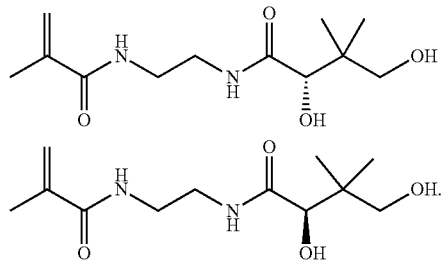

In yet another embodiment of any of the above hygroscopic hydrogel or hydrogels, the compound of formula I may be B5AMA:

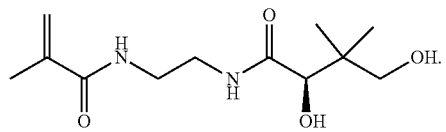

(B5AMA)

In yet another embodiment of any of the above hygroscopic hydrogel or hydrogels, the polymer may be a homopolymer, or a co-polymer.

In still another embodiment of any of the above hygroscopic hydrogel or hydrogels, the one or more monomers may be polymerized by free radical polymerization in the presence of an initiator and a catalyst.

In yet another embodiment of any of the above hygroscopic hydrogel or hydrogels, the initiator may be KPS, the catalyst may be TEMEDA, or both.

In another embodiment of any of the above hygroscopic hydrogel or hydrogels, the polymer may be cross-linked by free radical polymerization of the one or more monomers in the presence of one or more cross-linkers.

In yet another embodiment of any of the above hygroscopic hydrogel or hydrogels, the polymer may be cross-linked with any one or more of the following cross-linkers:

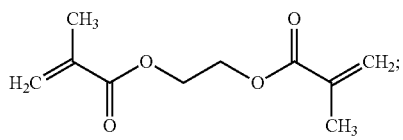

ethylene glycol dimethacrylate

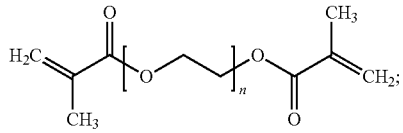

poly(ethylene glycol) dimethacrylate

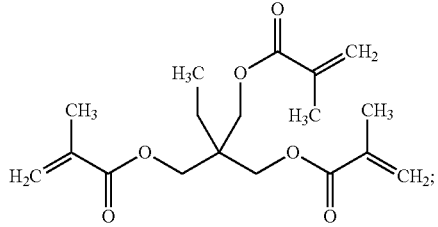

triethylene glycol dimethacrylate

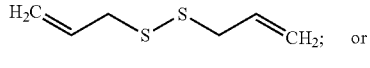  or allyl disulfide

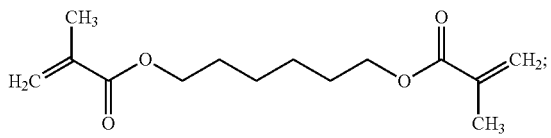

1,6-hexanediol dimethacrylate or any combinations thereof.

In yet another embodiment of any of the above hygroscopic hydrogel or hydrogels, the polymer may be cross-linked by N,N'-methylenebisacrylamide (Bis) cross-linker.

In yet another embodiment of any of the above hygroscopic hydrogel or hydrogels, the mol % of cross-linker may be a value within a range of about 5 to about 20 mol %, about 5 to about 15 mol %, or about 8 to about 12 mol %, or is about 10 mol %.

In still another embodiment of any of the above hygroscopic hydrogel or hydrogels, at least one of the monomers may be:

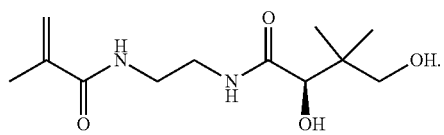

(B5AMA)

In still another embodiment of any of the above hygroscopic hydrogel or hydrogels, the polymer may be prepared by polymerization of two or more monomers.

In yet another embodiment of any of the above hygroscopic hydrogel or hydrogels, at least one of the monomers may be any one or more of

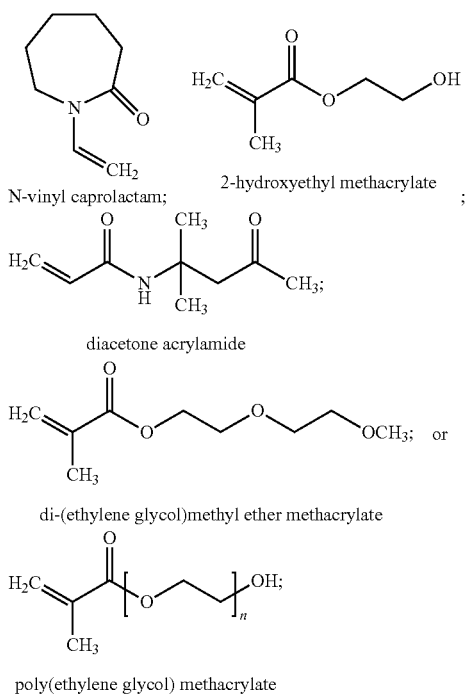

N-vinyl caprolactam; 2-hydroxyethyl methacrylate;

diacetone acrylamide di-(ethylene glycol)methyl ether methacrylate poly(ethylene glycol) methacrylate or any combinations thereof.

In still another embodiment of any of the above hygroscopic hydrogel or hydrogels, a molar ratio of the other monomer or monomers to the monomer which is the compound of formula I may be a value within a range of about 0.02 to about 2.

In another embodiment of any of the above hygroscopic hydrogel or hydrogels, at least one of the monomers may be di-(ethylene glycol)methyl ether methacrylate (DEGMEM).

In still another embodiment of any of the above hygroscopic hydrogel or hydrogels, the polymer may be a copolymer of DEGMEM and B5AMA monomers.

In another embodiment of any of the above hygroscopic hydrogel or hydrogels, a molar ratio of DEGMEM monomer to B5AMA monomer (DEGMEM/B5AMA) in the polymer may be a value within a range of about 1.1 to 1.5.

In yet another embodiment of any of the above hygroscopic hydrogel or hydrogels, the molar ratio of DEGMEM monomer to B5AMA monomer (DEGMEM/B5AMA) in the polymer may be about 1.37.

In still another embodiment of any of the above hygroscopic hydrogel or hydrogels, the polymer may be prepared by free radical polymerization in the presence of one or more cross-linkers, one or more initiators, and one or more catalysts.

In another embodiment of any of the above hygroscopic hydrogel or hydrogels, the cross-linker may be N',N'-methylene bisacrylamide (Bis), the initiator may be potassium persulfate, the catalyst may be TEMEDA, or any combinations thereof.

In yet another embodiment of any of the above hygroscopic hydrogel or hydrogels, polymerization may be performed with a catalyst and an initiator.

In another embodiment of any of the above hygroscopic hydrogel or hydrogels, polymerization may be in the presence of the cross-linker at about 10 mol %, the initiator at about 10 mol %, the catalyst at about 33 mol %, or any combinations thereof.

In another embodiment, there is provided herein a use of the compound of formula I for preparing any of the polymer or polymers as described herein, or any of the hygroscopic hydrogel or hydrogels as described herein.

In another embodiment, there is provided herein a use of any of the hygroscopic hydrogel or hydrogels as described herein for water harvesting.

In another embodiment, there is provided herein a use of any of the hygroscopic hydrogel or hydrogels as described herein water purification.

In another embodiment, there is provided herein a method for preparing B5AMA:

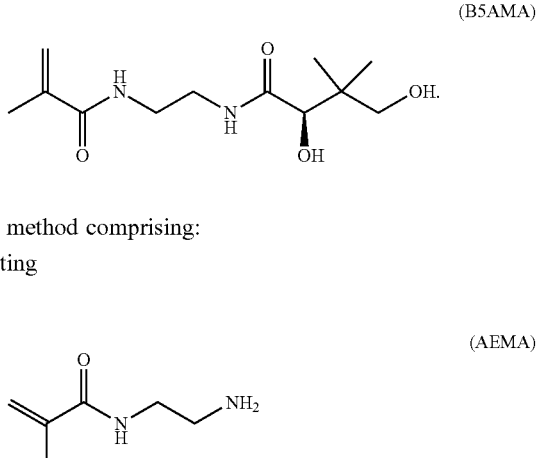

(B5AMA)

said method comprising:
reacting

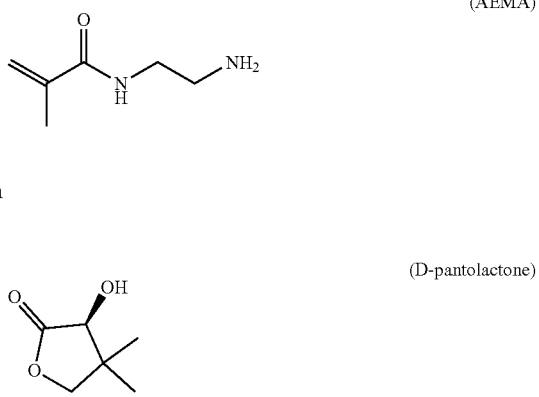

(AEMA)

with (D-pantolactone)

to form B5AMA.

In another embodiment of the above method, the AEMA may be reacted with D-pantolactone in the presence of a weak base.

In yet another embodiment of any of the above method or methods, the AEMA may be reacted with D-pantolactone in the presence of triethylamine (TEA).

In another embodiment, there is provided herein a method for preparing a hygroscopic hydrogel comprising:
polymerizing one or more monomers in the presence of at least one cross-linker, wherein at least one of the monomers is a compound or formula I.

In another embodiment of the above method, the polymerizing may be performed with a catalyst and an initiator.

In still another embodiment of any of the above method or methods, the polymerizing may comprise polymerizing B5AMA monomer:

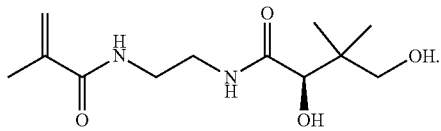

(B5AMA)

In still another embodiment of any of the above method or methods, the polymerizing step may generate a cross-linked polymer which is a homopolymer, or a co-polymer.

In yet another embodiment of any of the above method or methods, the one or more monomers may be polymerized by free radical polymerization in the presence of an initiator and a catalyst.

In still another embodiment of any of the above method or methods, the initiator may be KPS, the catalyst may be TEMEDA, or both.

In another embodiment of any of the above method or methods, the polymerizing may comprise free radical polymerization.

In another embodiment of any of the above method or methods, the cross-linker may be any one or more of the following cross-linkers:

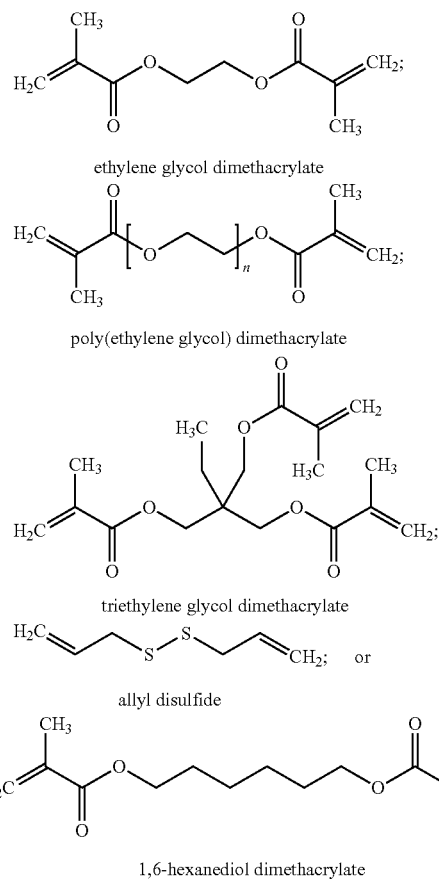

or any combinations thereof.

In another embodiment of any of the above method or methods, the cross-linker may be N,N'-methylenebisacrylamide (Bis).

In still another embodiment of any of the above method or methods, the mol % of cross-linker may be a value within a range of about 5 to about 20 mol %, about 5 to about 15 mol %, or about 8 to about 12 mol %, or about 10 mol %.

In another embodiment of any of the above method or methods, at least one of the monomers may be:

(B5AMA)

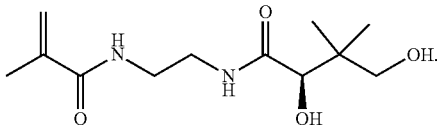

In still another embodiment of any of the above method or methods, the polymer may be prepared by polymerization of two or more monomers.

In yet another embodiment of any of the above method or methods, at least one of the monomers may be any one or more of:

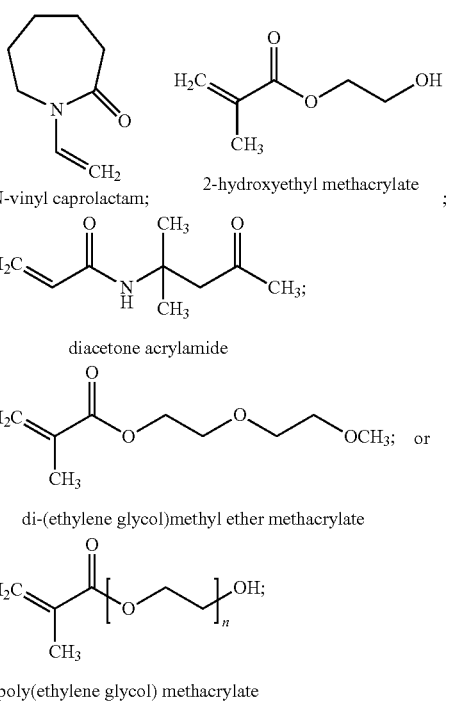

or any combinations thereof.

In yet another embodiment of any of the above method or methods, a molar ratio of the other monomer or monomers to the monomer which is the compound of formula I may be a value within a range of about 0.02 to about 2.

In yet another embodiment of any of the above method or methods, at least one of the monomers may be di-(ethylene glycol)methyl ether methacrylate (DEGMEM).

In still another embodiment of any of the above method or methods, the polymerizing step may generate a cross-linked polymer which is a co-polymer, wherein the polymer may be a co-polymer of DEGMEM and B5AMA monomers.

In another embodiment of any of the above method or methods, a molar ratio of DEGMEM monomer to B5AMA monomer (DEGMEM/B5AMA) in the polymer may be a value within a range of about 1.1 to 1.5.

In still another embodiment of any of the above method or methods, the molar ratio of DEGMEM monomer to B5AMA monomer (DEGMEM/B5AMA) in the polymer may be about 1.37.

In another embodiment of any of the above method or methods, the polymer may be prepared by free radical polymerization in the presence of one or more cross-linkers, one or more initiators, and one or more catalysts.

In still another embodiment of any of the above method or methods, the cross-linker may be N',N'-methylene bisacrylamide (Bis), the initiator may be potassium persulfate, the catalyst may be TEMEDA, or any combinations thereof.

In yet another embodiment of any of the above method or methods, polymerization may be in the presence of the cross-linker at about 10 mol %, the initiator at about 10 mol %, the catalyst at about 33 mol %, or any combinations thereof.

In another embodiment of any of the above method or methods, the polymerizing may comprise polymerizing B5AMA monomer, and the method may further comprise a step of preparing B5AMA monomer by:
reacting

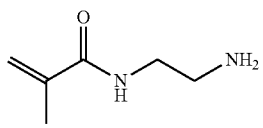

(AEMA)

with

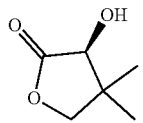

(D-pantolactone)

to form B5AMA.

In yet another embodiment of any of the above method or methods, the AEMA may be reacted with $_D$-pantolactone in the presence of a weak base.

In still another embodiment of any of the above method or methods, the AEMA may be reacted with $_D$-pantolactone in the presence of triethylamine (TEA).

In another embodiment, there is provided herein a hygroscopic hydrogel prepared by any of the method or methods as described herein.

In another embodiment, there is provided herein a method for water harvesting, comprising:
exposing any of the hygroscopic hydrogel or hydrogels as described herein to a source of water, and allowing the hygroscopic hydrogel to absorb water from the source of water.

In another embodiment of the above method, the method may further comprise a step of collecting absorbed water from the hygroscopic hydrogel.

In still another embodiment of any of the above method or methods, the step of collecting may comprise warming the hygroscopic hydrogel to cause release of water from the hygroscopic hydrogel.

In still another embodiment of any of the above method or methods, the hygroscopic hydrogel may be subsequently cooled, and the cycle may be repeated to collect additional water.

In yet another embodiment of any of the above method or methods, the step of collecting may comprise warming the hygroscopic hydrogel to a temperature of about 37° C.

In another embodiment of any of the above method or methods, the method may be for harvesting water from fluid, such as water or air.

In another embodiment of any of the above method or methods, the method may be for separating water from oil.

In another embodiment, there is provided herein a method for purifying water, comprising:
exposing any of the hygroscopic hydrogel or hydrogels as described herein to a fluid, absorbing water from the fluid, and warming the hygroscopic hydrogel to desorb the water.

In another embodiment of the above method, the hygroscopic hydrogel is subsequently cooled, and the cycle is repeated to collect additional water.

In a further embodiment, the method further comprising antifouling the water during absorption.

In another embodiment, there is provided herein a hydrogel comprising formula II:

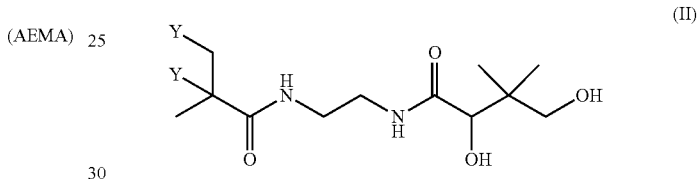

(II)

wherein each Y group is independently selected from the group consisting of H,

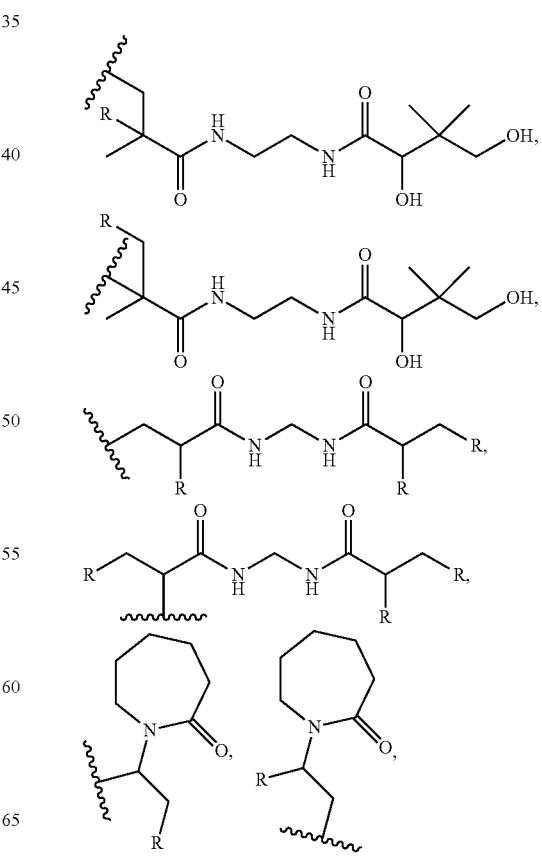

-continued
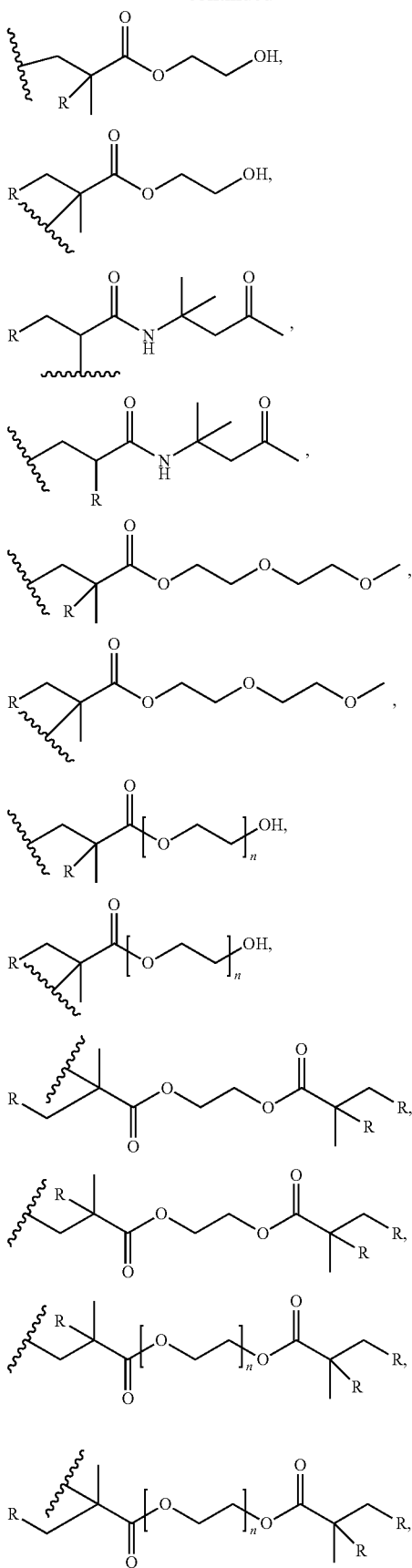
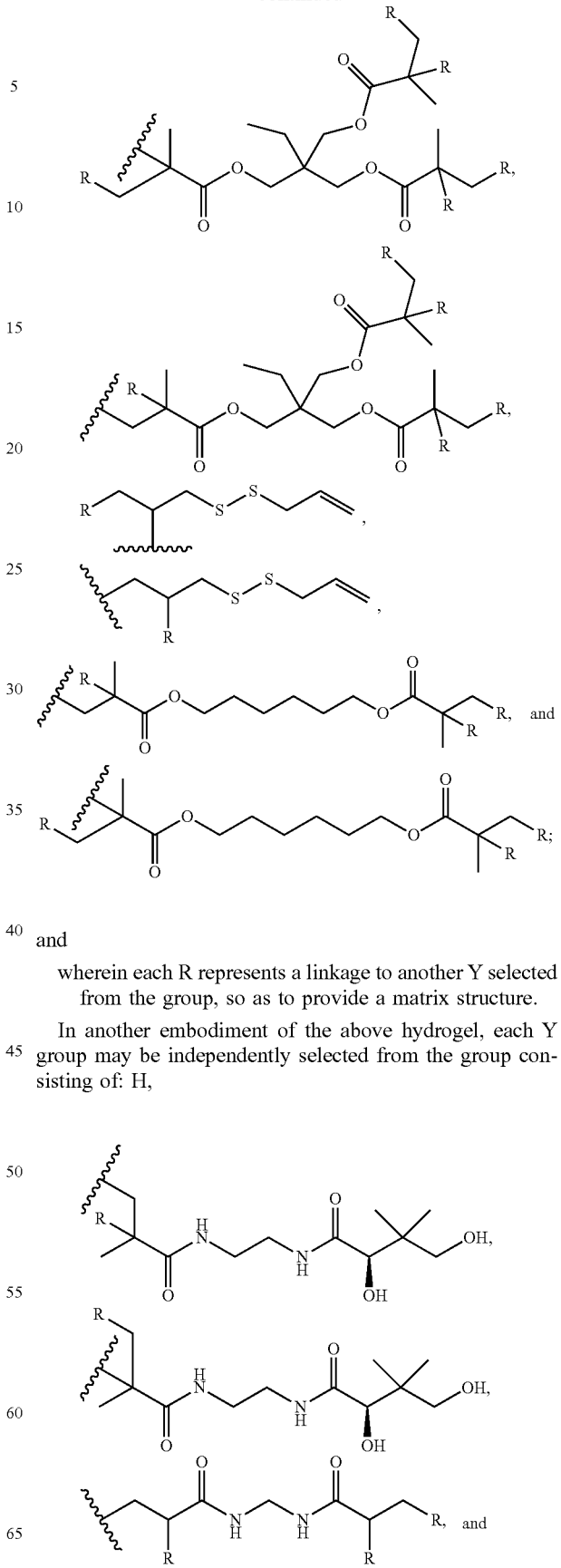
and
wherein each R represents a linkage to another Y selected from the group, so as to provide a matrix structure.
In another embodiment of the above hydrogel, each Y group may be independently selected from the group consisting of: H,
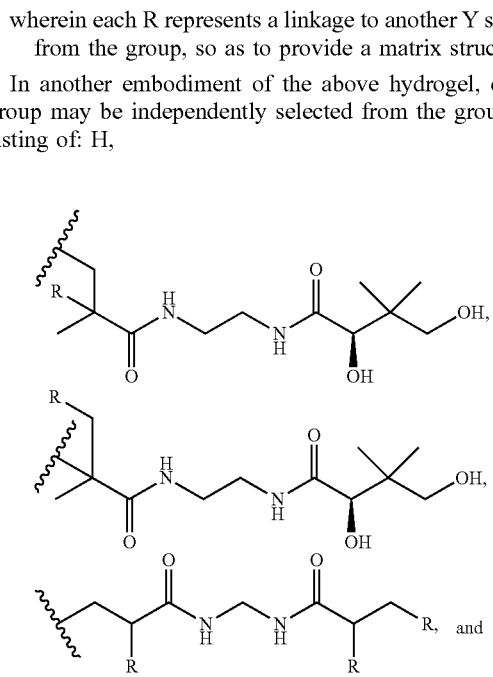

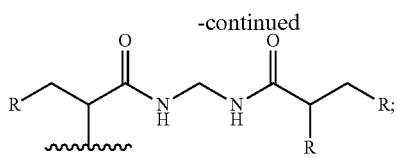

wherein each R represents a linkage to another Y selected from the group, so as to provide a matrix structure.

In another embodiment of any of the above hydrogel or hydrogels, the hydrogel may comprise a polymer of B5AMA cross-linked with Bis.

In yet another embodiment of any of the above hydrogel or hydrogels, each Y group may be independently selected from the group consisting of:

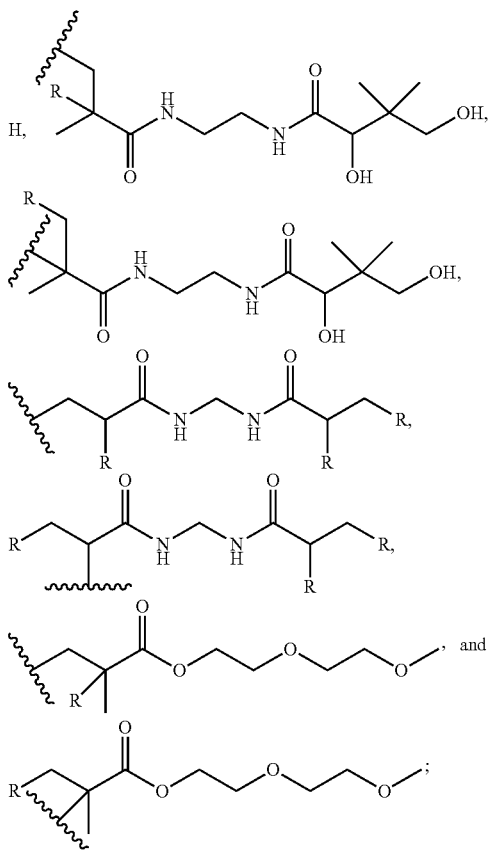

wherein each R represents a linkage to another Y selected from the group, so as to provide a matrix structure.

In another embodiment of any of the above hydrogel or hydrogels, the hydrogel may comprise a co-polymer of B5AMA and DEGMEM, cross-linked with Bis.

In another embodiment of any of the above hydrogel or hydrogels, the hydrogel may comprise one or more of:

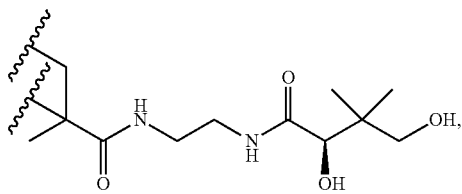

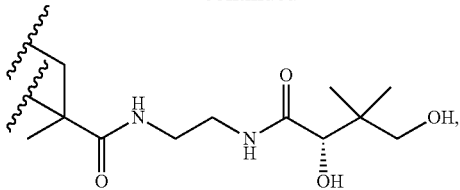

or a mixture thereof.

BRIEF DESCRIPTION OF THE DRAWINGS

These and other features of the invention will become more apparent from the following description in which reference is made to the appended drawings wherein.

DETAILED DESCRIPTION

Figure 1:
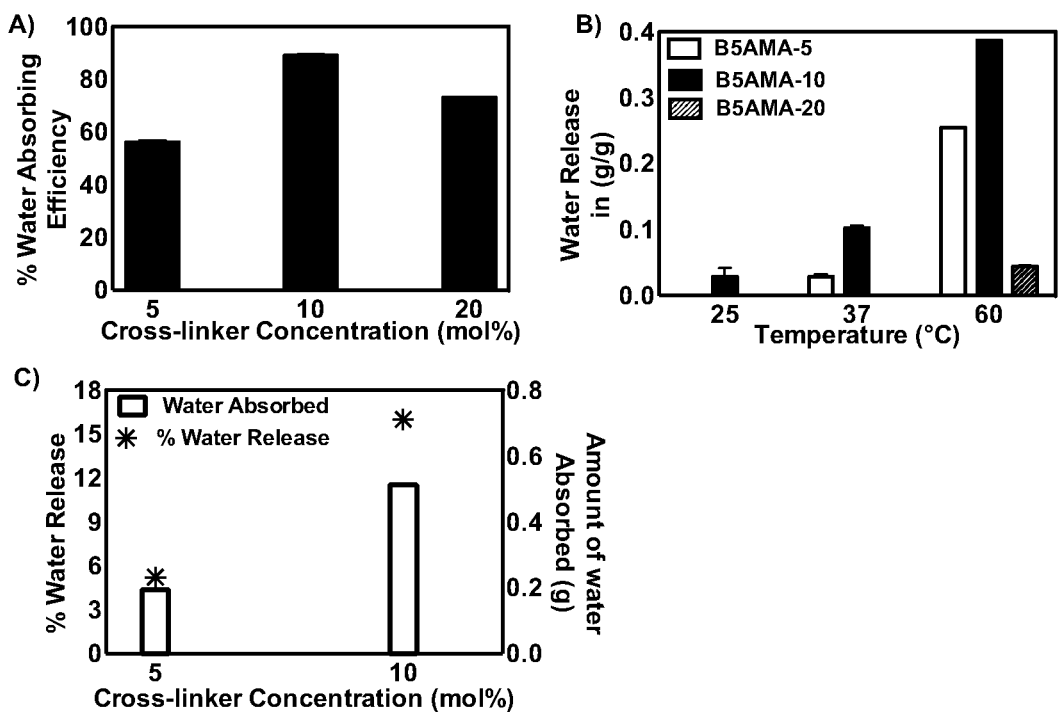
FIG. 1A shows water retention capacity of B5AMA hydrogels as a function of molar concentration of N',N'-methylene bisacrylamide.
FIG. 1B shows the water release efficacy in gram/gram of hydrogels, as a function of temperature and cross-linking density of hydrogels.
FIG. 1C shows the water recycling efficiency in comparison to the total amount of water retained by hydrogel samples prepared at 5 and 10 mol % cross-linker concentration.

One or more illustrative embodiments have been described by way of example. Described herein are hygroscopic hydrogels, monomers and polymers relating thereto, and methods for the production and/or use thereof, particularly in water harvesting.

Using a monomer derivative relating to vitamin B5, referred to herein as B5AMA, hygroscopic hydrogels have now been prepared and identified as having desirable water harvesting properties, which may include an ability to collect water, and release collected water upon a relatively mild increase in temperature. In studies described in detail herein, repeated water collection and release cycles were successfully performed. Several particularly effective hydrogels, as well as monomers and methods for the production thereof, have now been developed, as described in detail hereinbelow. Such hydrogels may be of use in a wide variety of applications where water collection and/or release is desired, such as but not limited to the agriculture, biotechnology, and/or biosensor industries It will be appreciated that embodiments and examples are provided for illustrative purposes intended for those skilled in the art, and are not meant to be limiting in any way. All references to embodiments, examples, aspects, formulas, compounds, compositions, solutions, kits and the like is intended to be illustrative and non-limiting.

Development of a simple and/or facile strategy to produce novel, cost efficient and simple materials; capable of holding copious amount of water and the release of water upon demand at ambient temperatures, as a function of the cross-linking density of polymer chains, may provide an alternative source to ensure the supply of portable clean water in arid regions, for example. The incorporation of antifouling properties in water harvesting materials may further ensure the availability of clean supply of water, upon harvesting the water from natural resources, such as from sea, or rainwater. The studies described in detail herein sought to develop reusable, economical, antifouling and water-releasing hydrogels, for the release of significant amount of water by relatively slight changes in the temperature, using highly hygroscopic and biocompatible analogue(s) of pantothenic acid. In comparison to the handful of existing hygroscopic materials, which generally require higher temperatures for the optimum water release ($\geq 50°$ C.) and complex synthesis in the presence of stimuli responsive moieties or the presence of ionic molecules (salts) in their polymeric architecture[5-7], the highly hydrophilic and polar nature of pantothenic acid analogous hydrogels may exhibit excellent water absorbing and release efficacies at ambient temperatures (~37° C.), as described herein.

Pantothenic acid (vitamin B5), a water-soluble vitamin, from vitamin B complex is hygroscopic, antibacterial, biocompatible and has moisturizing activities.[9-11] Pantothenic acid, a pantoic acid linked with β-alanine via amide bond, is of biological importance due to its incorporation in acetyl-CoA and is an essential cofactor for cell growth, fatty acid synthesis, carbohydrate metabolism, amino acid catabolism, and heme synthesis.[10] Pantothenic acid commercially exists as calcium salt and has seen limited applications in material science, due to its instability in salt free conditions and tedious synthetic reaction conditions.[11-12] The present inventors contemplate that hygroscopic nature of salt free pantothenic acid analogous hydrogels may represent competitive materials with superior water holding and/or water release capacities, at ambient temperature, and both of these properties are desirable for hydrogels to provide particularly economical water harvesting materials.[7] However, an important step to develop novel and functional pantothenic acid based materials and to study their role in water recycling efficacies is the synthesis of salt free pantothenic acid analogous monomer, capable of polymerization under relatively facile reaction conditions. Studies in which monomers were synthesized, used to prepare hydrogels, and the resulting hydrogels were studied for water harvesting, water purification and other properties are described in detail herein.

In an embodiment, there is provided herein a compound of formula I:

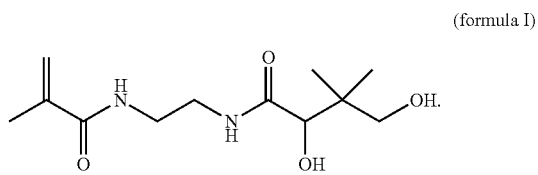 [SMILES: C=C(C)C(=O)NCCNC(=O)C(O)C(C)(C)CO]

(formula I)

In another embodiment of the above compound, the compound may be the R enantiomer, S enantiomer, or any mixture thereof. In an embodiment, the compound may be racemic, or may be enantiomerically enriched or enantiomerically pure.

In another embodiment, the compound may be:

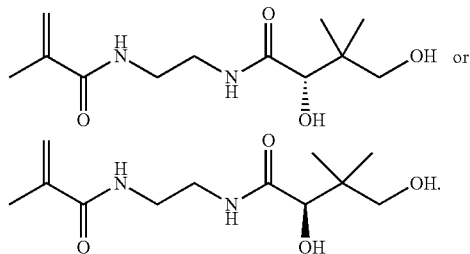

In still another embodiment, the compound may be B5AMA:

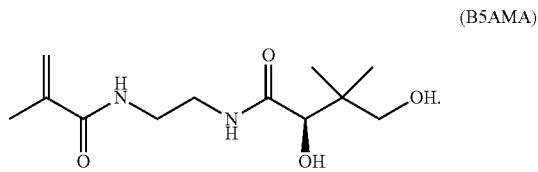 [SMILES: C=C(C)C(=O)NCCNC(=O)[C@H](O)C(C)(C)CO]

(B5AMA)

As will be understood, in an embodiment, the compound of formula I may be used as a monomer for the preparation of polymers and hydrogels, as described in detail here.

In another embodiment, there is provided herein a polymer prepared by polymerization of one or more monomers, wherein at least one of the monomers is any of the compound or compounds as defined above.

In another embodiment, the polymer may be a homopolymer, or a co-polymer. The compound for formula I may be a monomer of the polymer, and optionally one or more additional monomers may also be used to provide a co-polymer, for example.

In still another embodiment of the above polymers, the one or more monomers may be polymerized by free radical polymerization in the presence of an initiator and a catalyst. The person of skill in the art having regard to the teachings herein will be aware of a wide variety of techniques for polymerizing monomers as described herein, as well as for cross-linking (if desired), so as to provide polymers and/or hydrogels suitable for the desired implementation(s) and/or application(s). The skilled person will also understand that one of more functional group(s) of monomers as described herein may be varied or modified to accommodate a desired polymerization technique, if desired. Polymerization techniques, reagents, conditions, and catalysts are known in the art, see for example: Moad, G; Solomon, DH; The Chemistry of Radical Polymerization (Second Edition), Elsevier Science Ltd, 2005, ISBN 9780080442884, herein incorporated by reference in its entirety.

As will be understood, polymerization may typically involve use of an initiator and a catalyst so as to encourage polymer and/or hydrogel formation. The skilled person having regard to the teachings herein will be aware of a wide variety of initiators and catalysts for polymerization, which may be selected based on the monomers and/or conditions being used. By way of example, in an embodiment, an initiator may be selected from KPS, azobisisobutyronitrile (AIBN), VA-044, heat, UV-radiation and others. By way of another example, in an embodiment, a catalyst may be selected from TEMEDA, heat, and others. In an embodiment, the initiator may be KPS, the catalyst may be TEMEDA, or both.

In another embodiment of any of the above polymer or polymers, the polymer may be cross-linked. In certain embodiments, the polymer may be cross-linked as part of the polymerization of the polymer, or the polymer may be cross-linked after polymerization of the polymer, for example. In certain embodiments, the polymer may be cross-linked by free radical polymerization of the one or more monomers in the presence of one or more cross-linkers, for example.

In another embodiment of any of the above polymer or polymers, the polymer may be cross-linked with any one or more of the following cross-linkers:

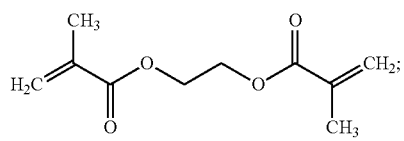

ethylene glycol dimethacrylate

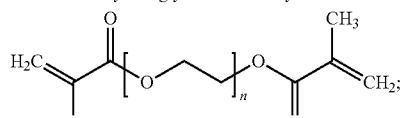

poly(ethylene glycol) dimethacrylate

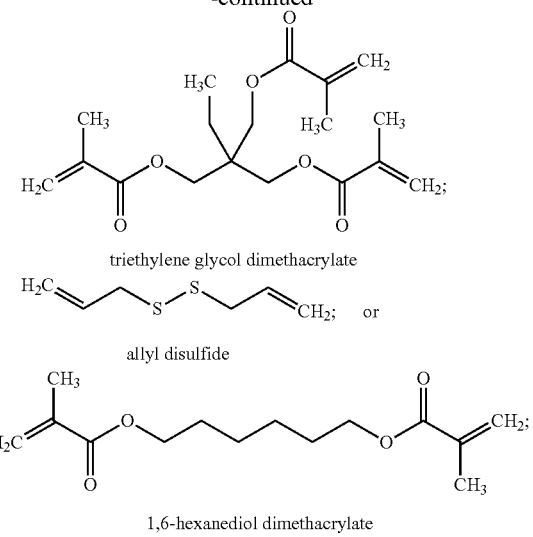

triethylene glycol dimethacrylate allyl disulfide 1,6-hexanediol dimethacrylate or any combinations thereof.

The skilled person having regard to the teachings herein will be aware of a wide variety of suitable cross-linkers, which may be selected based on the monomers and/or conditions being used and/or desired hydrogel properties. In an embodiment, suitable cross-linkers may include those with two or more "activated" double bonds so as to provide for cross-linking, such as those found in methacrylamide, methacrylate, acrylamide, acrylate, N-vinyl, and other such moieties. By way of example, in an embodiment, the cross-linker may be N,N'-methylenebisacrylamide (Bis) cross-linker. Bis may be understood by a person of skill in the art to have two "activated" double bonds.

In yet another embodiment of any of the above polymer or polymers, at least one of the monomers may be:

(B5AMA)

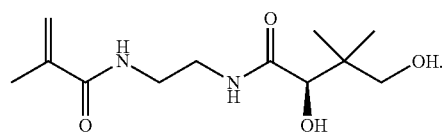

In another embodiment of any of the above polymer or polymers, the polymer may be prepared by polymerization of two or more monomers. The skilled person having regard to the teachings herein will be aware of a wide variety of monomers which may be used for polymerization, which may be selected based on the monomers and/or conditions being used and/or desired properties of resultant polymer or hydrogel properties. By way of example, by using a second monomer in addition to the monomer of formula I, it is contemplated that hydrophilic/hydrophobic properties of the hydrogel may be adjusted as desired (see Example 2 below). In certain embodiments, the additional monomers may include those with at least one "activated" double bond so as to allow for polymerization, such as methacrylamide, methacrylate, acrylamide, acrylate, N-vinyl, and other such moieties. B5AMA and DEGMEM may each be understood by a person of skill in the art to have one "activated" double bond. By way of example, in an embodiment of any of the above polymer or polymers, at least one of the monomers may be any one or more of:

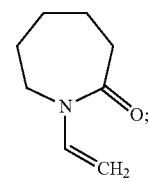

N-vinyl caprolactam

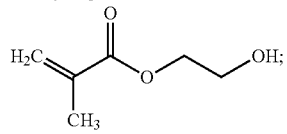

2-hydroxyethyl methacrylate

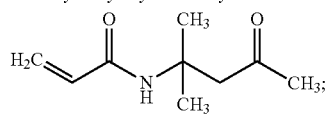

diacetone acrylamide

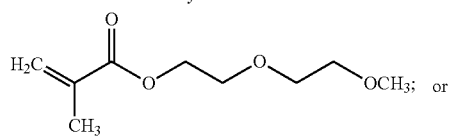

di-(ethylene glycol)methyl ether methacrylate

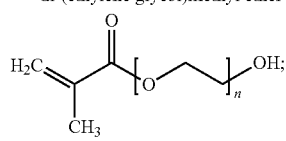

poly(ethylene glycol) methacrylate or any combinations thereof.

In another embodiment of any of the above polymer or polymers, a molar ratio of the other monomer or monomers to the monomer which is the compound of formula I may be a value within a range of about 0.02 to about 2.

By way of example, in certain embodiments, at least one of the monomers may be di-(ethylene glycol)methyl ether methacrylate (DEGMEM). In still another embodiment of any of the above polymer or polymers, the polymer may be a co-polymer of DEGMEM and B5AMA monomers. In yet another embodiment of any of the above polymer or polymers, a molar ratio of DEGMEM monomer to B5AMA monomer (DEGMEM/B5AMA) in the polymer may be a value within a range of about 1.1 to 1.5. In still another embodiment of any of the above polymer or polymers, the molar ratio of DEGMEM monomer to B5AMA monomer (DEGMEM/B5AMA) in the polymer may be about 1.37.

In another embodiment of any of the above polymer or polymers, the polymer may be prepared by free radical polymerization in the presence of one or more cross-linkers, one or more initiators, and one or more catalysts. In still another embodiment of any of the above polymer or polymers, the cross-linker may be N',N'-methylene bisacrylamide (BIS), the initiator may be potassium persulfate, the catalyst may be TEMEDA, or any combinations thereof.

In yet another embodiment of any of the above polymer or polymers, polymerization may be in the presence of the cross-linker at about 10 mol %, the initiator at about 10 mol %, the catalyst at about 33 mol %, or any combinations thereof.

In another embodiment, there is provided herein a hygroscopic hydrogel comprising a cross-linked polymer, the polymer being prepared by polymerization of one or more monomers, wherein at least one of the monomers is a compound of formula I:

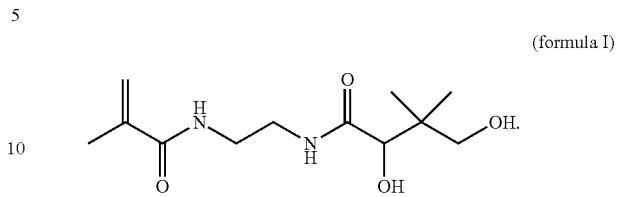

(formula I)

In another embodiment, the compound of formula I may be the R enantiomer, the S enantiomer, or any mixture thereof. In an embodiment, the compound of formula I may be racemic, or may be enantiomerically enriched or enantiomerically pure. In another embodiment of any of the above hygroscopic hydrogel or hydrogels, the compound of formula I may be:

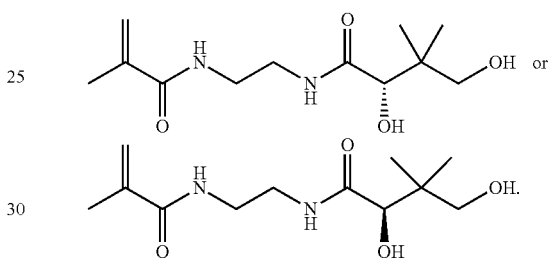

In yet another embodiment of any of the above hygroscopic hydrogel or hydrogels, the compound of formula I may be B5AMA:

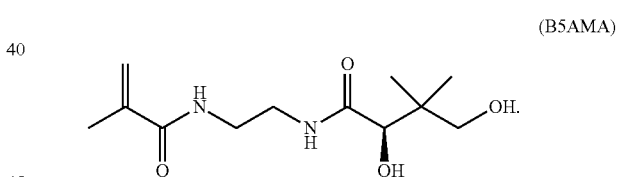

(B5AMA)

In yet another embodiment of any of the above hygroscopic hydrogel or hydrogels, the polymer may be a homopolymer, or a co-polymer. The compound of formula I may be a monomer of the polymer, and optionally one or more additional monomers may also be used to provide a co-polymer, for example.

In still another embodiment of any of the above hygroscopic hydrogel or hydrogels, the one or more monomers may be polymerized by free radical polymerization in the presence of an initiator and a catalyst. The person of skill in the art having regard to the teachings herein will be aware of a wide variety of techniques for polymerizing monomers as described herein, as well as for cross-linking, so as to provide hydrogels suitable for the desired implantation(s) and/or application(s). The skilled person will also understand that one of more functional group(s) of monomers as described herein may be varied or modified to accommodate a desired polymerization technique, if desired. Polymerization techniques, reagents, conditions are known in the art, for example: Moad, G; Solomon, D H; The Chemistry of Radical Polymerization (Second Edition), Elsevier Science Ltd, 2005, ISBN 9780080442884, herein incorporated by reference in its entirety.

As will be understood, polymerization may typically involve use of an initiator and a catalyst so as to encourage hydrogel formation. The skilled person having regard to the teachings herein will be aware of a wide variety of initiators and catalysts for polymerization, which may be selected based on the monomers and/or conditions being used. By way of example, in an embodiment, an initiator may be selected from KPS, azobisisobutyronitrile (AIBN), VA-044, heat, UV-radiation and others. By way of another example, in an embodiment, a catalyst may be selected from TEMEDA, heat, and others. In an embodiment, the initiator may be KPS, the catalyst may be TEMEDA, or both.

In another embodiment of any of the above hydrogels, the polymer may be cross-linked as part of the polymerization of the polymer, or the polymer may be cross-linked after polymerization of the polymer, for example. In certain embodiments, the polymer may be cross-linked by free radical polymerization of the one or more monomers in the presence of one or more cross-linkers, for example.

In yet another embodiment of any of the above hygroscopic hydrogel or hydrogels, the polymer may be cross-linked with any one or more of the following cross-linkers:

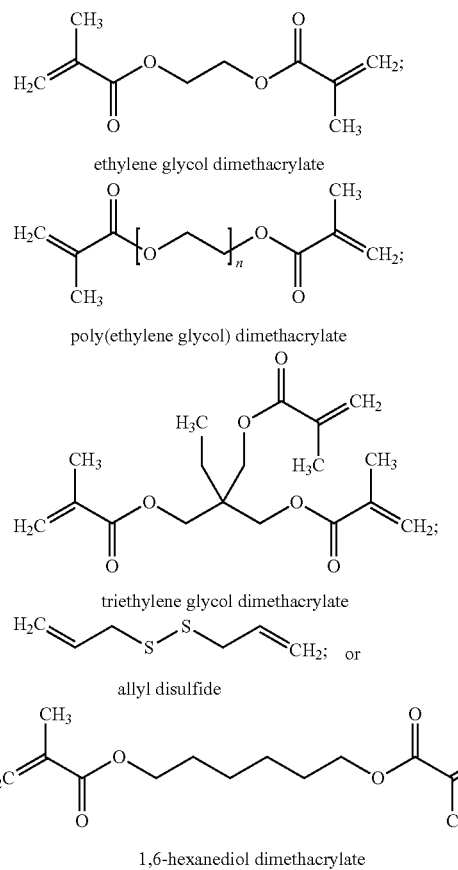

ethylene glycol dimethacrylate poly(ethylene glycol) dimethacrylate triethylene glycol dimethacrylate allyl disulfide 1,6-hexanediol dimethacrylate or any combinations thereof.

The skilled person having regard to the teachings herein will be aware of a wide variety of suitable cross-linkers, which may be selected based on the monomers and/or conditions being used and/or desired hydrogel properties. In an embodiment, suitable cross-linkers may include those with two or more "activated" double bonds so as to provide for cross-linking, such as those found in methacrylamide, methacrylate, acrylamide, acrylate, N-vinyl, and other such moieties. By way of example, in an embodiment, the polymer may be cross-linked by N,N'-methylenebisacrylamide (Bis) cross-linker. Bis may be understood by a person of skill in the art to have two "activated" double bonds.

In yet another embodiment of any of the above hygroscopic hydrogel or hydrogels, the mol % of cross-linker may be a value within a range of about 5 to about 20 mol %, about 5 to about 15 mol %, or about 8 to about 12 mol %, or may be about 10 mol %.

In still another embodiment of any of the above hygroscopic hydrogel or hydrogels, at least one of the monomers may be:

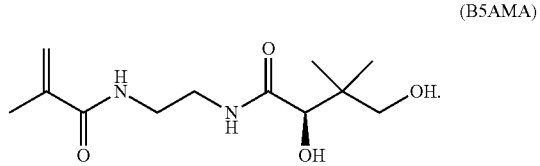 [SMILES: C=C(C)C(=O)NCCNC(=O)[C@H](O)C(C)(C)CO]

(B5AMA)

In still another embodiment of any of the above hygroscopic hydrogel or hydrogels, the polymer may be prepared by polymerization of two or more monomers. The skilled person having regard to the teachings herein will be aware of a wide variety of monomers which may be used for polymerization, which may be selected based on the monomers and/or conditions being used and/or desired properties of resultant hydrogel properties. By way of example, by using a second monomer in addition to the monomer of formula I, it is contemplated that hydrophilic/hydrophobic properties of the hydrogel may be adjusted as desired (see Example 2 below). In certain embodiments, the additional monomers may include any co-monomers with at least one "activated" double bond so as to allow for polymerization, such as methacrylamide, methacrylate, acrylamide, acrylate, N-vinyl, and other such moieties. N-vinyl caprolactam (NVC) may be understood by a person of skill in the art to have one "activated" double bond. By way of example, in an embodiment, at least one of the monomers may be any one or more of

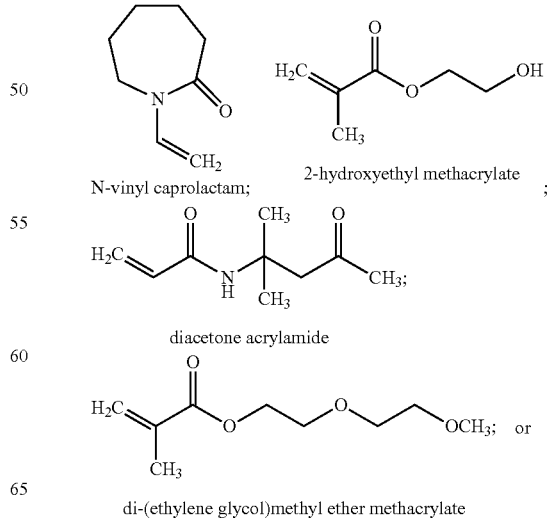

N-vinyl caprolactam;

2-hydroxyethyl methacrylate;

diacetone acrylamide di-(ethylene glycol)methyl ether methacrylate

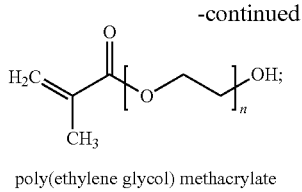

poly(ethylene glycol) methacrylate or any combinations thereof.

In an embodiment, "n" in the poly(ethylene glycol) methacrylate may be about 2-20, such as about 11.

In still another embodiment of any of the above hygroscopic hydrogel or hydrogels, a molar ratio of the other monomer or monomers to the monomer which is the compound of formula I may be a value within a range of about 0.02 to about 2.

By way of example, in certain embodiments of the above hydrogels, at least one of the monomers may be di-(ethylene glycol)methyl ether methacrylate (DEGMEM). In still another embodiment of any of the above hygroscopic hydrogel or hydrogels, the polymer may be a co-polymer of DEGMEM and B5AMA monomers. In another embodiment of any of the above hygroscopic hydrogel or hydrogels, a molar ratio of DEGMEM monomer to B5AMA monomer (DEGMEM/B5AMA) in the polymer may be a value within a range of about 1.1 to 1.5. In yet another embodiment of any of the above hygroscopic hydrogel or hydrogels, the molar ratio of DEGMEM monomer to B5AMA monomer (DEGMEM/B5AMA) in the polymer may be about 1.37.

In still another embodiment of any of the above hygroscopic hydrogel or hydrogels, the polymer may be prepared by free radical polymerization in the presence of one or more cross-linkers, one or more initiators, and one or more catalysts. In another embodiment of any of the above hygroscopic hydrogel or hydrogels, the cross-linker may be N',N'-methylene bisacrylamide (Bis), the initiator may be potassium persulfate, the catalyst may be TEMEDA, or any combinations thereof.

In yet another embodiment of any of the above hygroscopic hydrogel or hydrogels, polymerization may be performed with a catalyst and an initiator. In another embodiment of any of the above hygroscopic hydrogel or hydrogels, polymerization may be in the presence of the cross-linker at about 10 mol %, the initiator at about 10 mol %, the catalyst at about 33 mol %, or any combinations thereof.

In another embodiment, the compound of formula I may be used for preparing any of the polymer or polymers as described herein, or any of the hygroscopic hydrogel or hydrogels as described herein.

In yet another embodiment, any of the hygroscopic hydrogel or hydrogels as described herein may be used for water harvesting or water purification. As will be understood, water harvesting may include any of collecting water, accumulating water, or otherwise capturing water within the hydrogel, and in certain embodiments said water may be recovered from the hydrogel. In certain embodiments, water may be harvested or purified from generally any suitable water source such as, but not limited to, water from a river, mist, fog, dew, air, or other such water source. In certain embodiments, it is contemplated that water may be harvested from an oil-water mixture. In certain embodiments, water may be harvested from a fluid such as water or air, providing a de-humidifier effect to the ambient air. In certain embodiments, water collected in the hydrogel may be recovered from the hydrogel, providing a source of usable water to a user. In certain embodiments, water may be recovered from the hydrogel when the hydrogel temperature increases, causing water to be released from the hydrogel.

In another embodiment, the hygroscopic hydrogel or hydrogels as described herein may be used for separating water from oil.

In another embodiment, there is provided herein a method for preparing B5AMA:

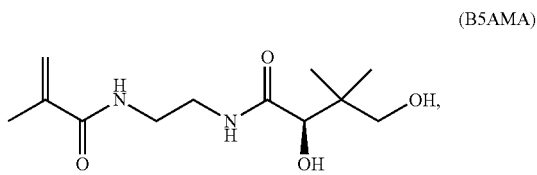 [SMILES: C=C(C)C(=O)NCCNC(=O)[C@H](O)C(C)(C)CO]

said method comprising:
reacting

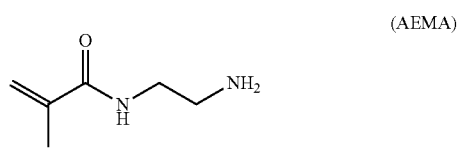

with

to form B5AMA.

In another embodiment of the above method, the AEMA may be reacted with $_D$-pantolactone in the presence of a weak base. In yet another embodiment of any of the above method or methods, the AEMA may be reacted with $_D$-pantolactone in the presence of the weak base triethylamine (TEA).

In another embodiment, there is provided herein a method for preparing a hygroscopic hydrogel, comprising:
polymerizing one or more monomers in the presence of at least one cross-linker, wherein at least one of the monomers is a compound or formula I.

In still another embodiment, the one or more monomers may be polymerized by free radical polymerization in the presence of an initiator and a catalyst. The person of skill in the art having regard to the teachings herein will be aware of a wide variety of techniques for polymerizing monomers as described herein, as well as for cross-linking, so as to provide polymers and/or hydrogels suitable for the desired implementation(s) and/or application(s). The skilled person will also understand that one of more functional group(s) of monomers as described herein may be varied or modified to accommodate a desired polymerization technique, if desired. Polymerization techniques, reagents, conditions, and catalysts are known in the art, see for example: Moad, G; Solomon, D H; The Chemistry of Radical Polymerization (Second Edition), Elsevier Science Ltd, 2005, ISBN 9780080442884, herein incorporated by reference in its entirety.

As will be understood, polymerization may typically involve use of an initiator and a catalyst so as to encourage hydrogel formation. The skilled person having regard to the teachings herein will be aware of a wide variety of initiators and catalysts for polymerization, which may be selected based on the monomers and/or conditions being used. By way of example, in an embodiment, an initiator may be selected from KPS, azobisisobutyronitrile (AIBN), VA-044, heat, UV-radiation and others. By way of another example, in an embodiment, a catalyst may be selected from TEMEDA, heat, and others. In an embodiment, the initiator may be KPS, the catalyst may be TEMEDA, or both.

In another embodiment of any of the above method or methods, the polymer generated by monomer polymerization may be cross-linked by the cross-linker as part of the polymerization, or the polymer generated by monomer polymerization may be cross-linked by the cross-linker after monomer polymerization, for example. In certain embodiments, the polymer may be cross-linked by free radical polymerization of the one or more monomers in the presence of one or more cross-linkers, for example.

In still another embodiment of any of the above method or methods, the polymerizing may comprise polymerizing B5AMA monomer:

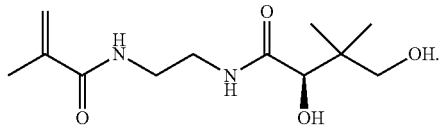

(B5AMA)

In still another embodiment of any of the above method or methods, the polymerizing step may generate a cross-linked polymer which is a homopolymer, or a co-polymer. The compound for formula I may be a monomer of the polymer, and optionally one or more additional monomers may also be used to provide a co-polymer, for example.

In yet another embodiment of any of the above method or methods, the one or more monomers may be polymerized by free radical polymerization in the presence of an initiator and a catalyst. In still another embodiment of any of the above method or methods, the initiator may be KPS, the catalyst may be TEMEDA, or both. In another embodiment of any of the above method or methods, the polymerizing may comprise free radical polymerization.

In another embodiment of any of the above method or methods, the cross-linker may be any one or more of the following cross-linkers:

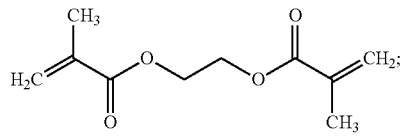

ethylene glycol dimethacrylate

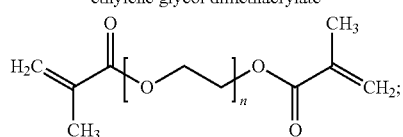

poly(ethylene glycol) dimethacrylate

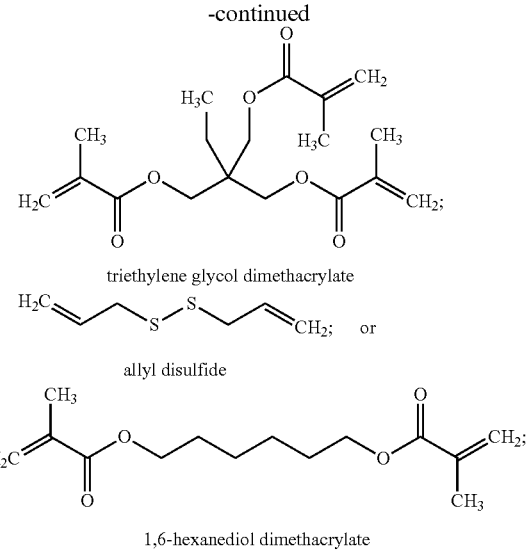

triethylene glycol dimethacrylate allyl disulfide 1,6-hexanediol dimethacrylate or any combinations thereof.

The skilled person having regard to the teachings herein will be aware of a wide variety of suitable cross-linkers, which may be selected based on the monomers and/or conditions being used and/or desired hydrogel properties. In an embodiment, suitable cross-linkers may include those with two or more "activated" double bonds so as to provide for cross-linking, such as those found in methacrylamide, methacrylate, acrylamide, acrylate, N-vinyl, and other such moieties. Examples of cross-linkers are known in the art, see for example: Moad, G; Solomon, D H; The Chemistry of Radical Polymerization (Second Edition), Elsevier Science Ltd, 2005, ISBN 9780080442884, herein incorporated by reference in its entirety. By way of example, in an embodiment, the cross-linker may be N,N'-methylenebisacrylamide (Bis) cross-linker.

In still another embodiment of any of the above method or methods, the mol % of cross-linker may be a value within a range of about 5 to about 20 mol %, about 5 to about 15 mol %, or about 8 to about 12 mol %, or about 10 mol %.

In another embodiment of any of the above method or methods, at least one of the monomers may be:

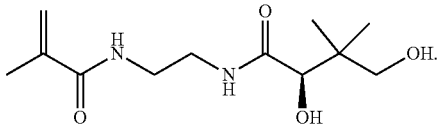

(B5AMA)

In still another embodiment of any of the above method or methods, the polymer may be prepared by polymerization of two or more monomers. The skilled person having regard to the teachings herein will be aware of a wide variety of monomers which may be used for polymerization, which may be selected based on the monomers and/or conditions being used and/or desired properties of resultant hydrogel properties. By way of example, by using a second monomer in addition to the monomer of formula I, it is contemplated that hydrophilic/hydrophobic properties of the hydrogel may be adjusted as desired (see Example 2 below). In certain embodiments, the additional monomers may include those with at least one "activated" double bond so as to allow for polymerization, such as methacrylamide, methacrylate, acrylamide, acrylate, N-vinyl, and other such moieties. By way of example, in an embodiment of any of the above hydrogel or hydrogels, at least one of the monomers may be any one or more of:

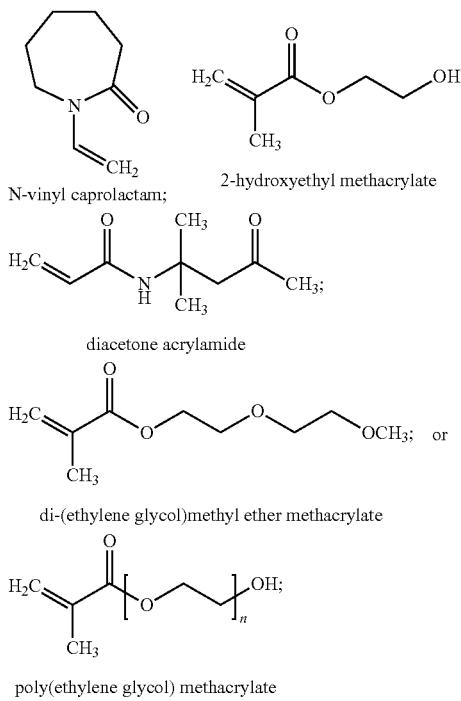

N-vinyl caprolactam; 2-hydroxyethyl methacrylate;

diacetone acrylamide di-(ethylene glycol)methyl ether methacrylate poly(ethylene glycol) methacrylate or any combinations thereof.

In yet another embodiment of any of the above method or methods, a molar ratio of the other monomer or monomers to the monomer which is the compound of formula I may be a value within a range of about 0.02 to about 2.

In yet another embodiment of any of the above method or methods, at least one of the monomers may be di-(ethylene glycol)methyl ether methacrylate (DEGMEM). In still another embodiment of any of the above method or methods, the polymerizing step may generate a cross-linked polymer which is a co-polymer, wherein the polymer may be a co-polymer of DEGMEM and B5AMA monomers. In another embodiment of any of the above method or methods, a molar ratio of DEGMEM monomer to B5AMA monomer (DEGMEM/B5AMA) in the polymer may be a value within a range of about 1.1 to 1.5. In still another embodiment of any of the above method or methods, the molar ratio of DEGMEM monomer to B5AMA monomer (DEGMEM/B5AMA) in the polymer may be about 1.37.

In another embodiment of any of the above method or methods, the polymer may be prepared by free radical polymerization in the presence of one or more cross-linkers, one or more initiators, and one or more catalysts. In still another embodiment of any of the above method or methods, the cross-linker may be N',N'-methylene bisacrylamide (Bis), the initiator may be potassium persulfate, the catalyst may be TEMEDA, or any combinations thereof.

In yet another embodiment of any of the above method or methods, polymerization may be in the presence of the cross-linker at about 10 mol %, the initiator at about 10 mol %, the catalyst at about 33 mol %, or any combinations thereof.

In another embodiment of any of the above method or methods, the polymerizing may comprise polymerizing B5AMA monomer, and the method may further comprise a step of preparing B5AMA monomer by: reacting

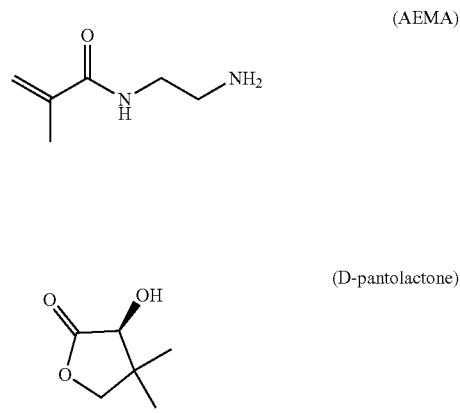

with (D-pantolactone)

to form B5AMA.

In yet another embodiment of any of the above method or methods, the AEMA may be reacted with $_D$-pantolactone in the presence of a weak base. In still another embodiment of any of the above method or methods, the AEMA may be reacted with $_D$-pantolactone in the presence of triethylamine (TEA) as weak base.

In another embodiment, there is provided herein a hygroscopic hydrogel prepared by any of the method or methods as described herein.

In another embodiment, there is provided herein a method for water harvesting, comprising:
  exposing any of the hygroscopic hydrogel or hydrogels as described herein to a source of water, and allowing the hygroscopic hydrogel to absorb water from the source of water.

In certain embodiments, water may be harvested or purified from generally any suitable water source such as, but not limited to, water from a river, mist, fog, dew, air, or other such water source. In certain embodiments, it is contemplated that water may be harvested from an oil-water mixture. In certain embodiments, water may be harvested or purified from a fluid such as water or air, providing a de-humidifier effect to the ambient air. In certain embodiments, water collected in the hydrogel may be recovered from the hydrogel, providing a source of usable water to a user. In certain embodiments, water may be recovered from the hydrogel when the hydrogel temperature increases, causing water to be released from the hydrogel.

In another embodiment of the above method, the method may further comprise a step of collecting absorbed water from the hygroscopic hydrogel.

In still another embodiment of any of the above method or methods, the step of collecting may comprise warming the hygroscopic hydrogel to cause release of water from the hygroscopic hydrogel. For example, in certain embodiments, the hydrogel may be warmed from a room temperature or ambient temperature (for example, a temperature of about 20-25° C., such as 23° C.) to a temperature at or above about 35° C., such as 37° C.

In still another embodiment of any of the above method or methods, the hygroscopic hydrogel may be subsequently cooled, and the cycle may be repeated to collect additional water. In certain embodiments, the hygroscopic hydrogel may be returned to a room temperature or ambient temperature (for example, a temperature of about 20-25° C., such as 23° C.).

In yet another embodiment of any of the above method or methods, the step of collecting may comprise warming the hygroscopic hydrogel to a temperature of about 37° C.

In another embodiment of any of the above method or methods, the method may be for harvesting water from a fluid such as water or air.

In another embodiment of any of the above method or methods, the method may be for separating water from oil.

In certain embodiments, water may be antifouled during absorption from a water source or fluid.

In another embodiment, there is provided herein a hydrogel comprising formula II:

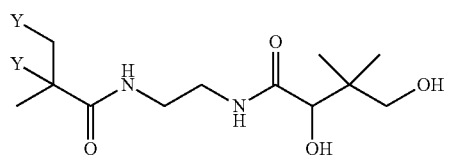

(II)

wherein each Y group is independently selected from the group consisting of H,

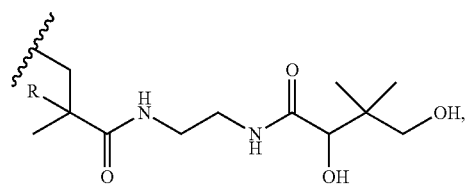

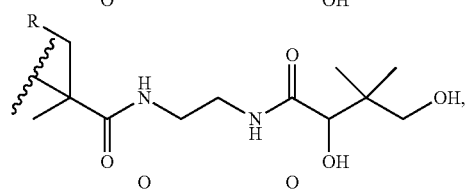

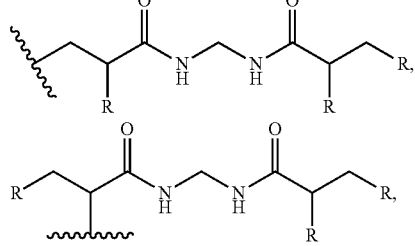

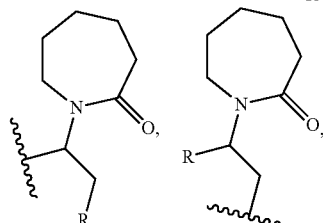

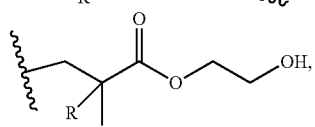

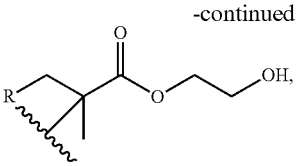

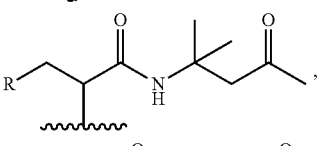

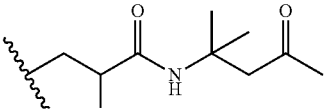

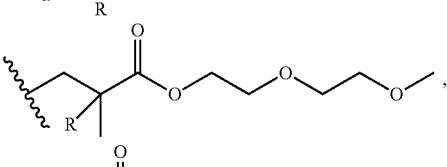

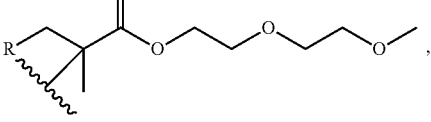

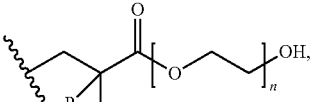

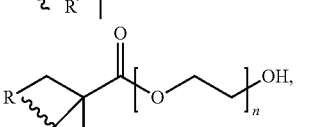

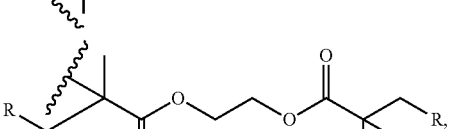

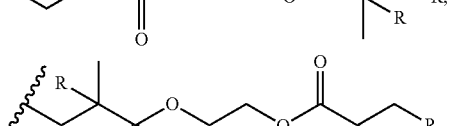

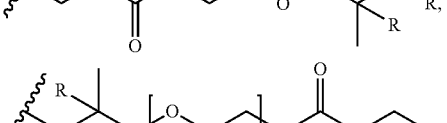

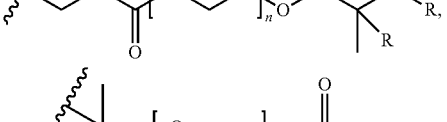

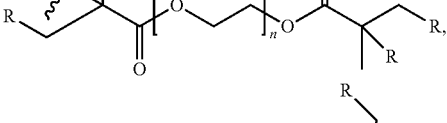

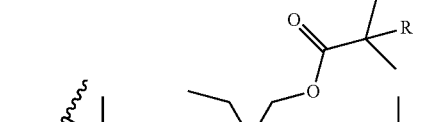

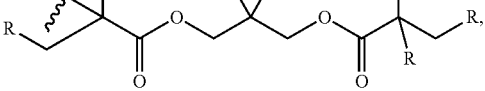

-continued

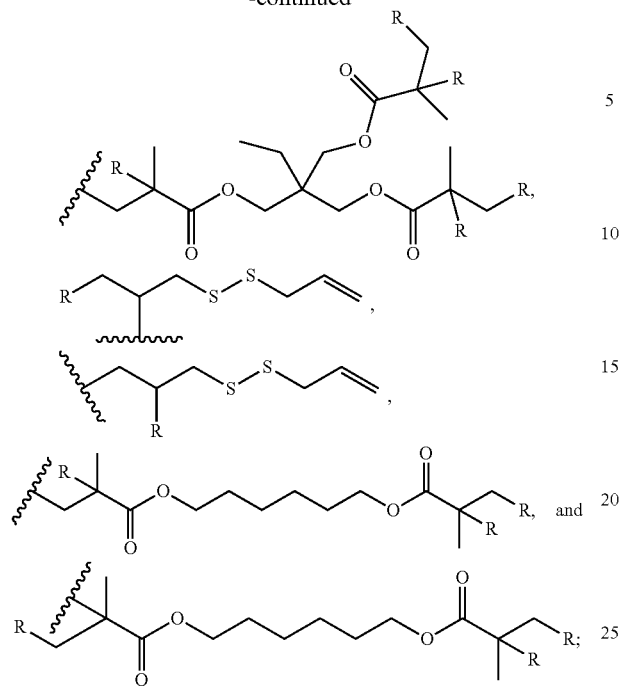

and
wherein each R represents a linkage to another Y selected from the group, so as to provide a matrix structure.

As will be understood, the hydrogel of formula II has a 3-dimensional matrix-type structure. The size of the hydrogel of formula II may vary widely, depending on the particular preparation, molar ratios and amounts used, and several other such factors.

In another embodiment of the above hydrogel, each Y group may be independently selected from the group consisting of H,

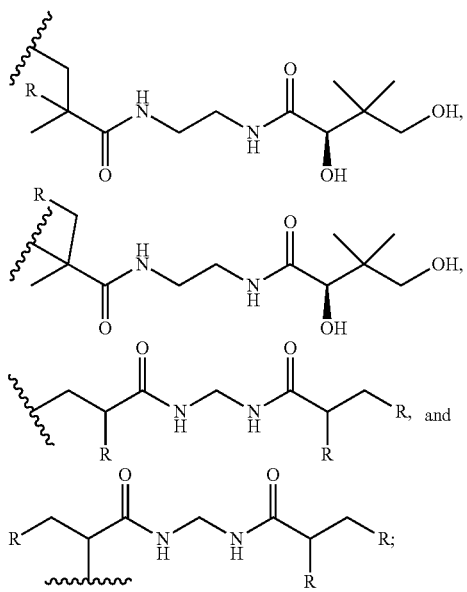

wherein each R represents a linkage to another Y selected from the group, so as to provide a matrix structure.

In another embodiment of any of the above hydrogel or hydrogels, the hydrogel may comprise a polymer of B5AMA cross-linked with Bis.

In yet another embodiment of any of the above hydrogel or hydrogels, each Y group may be independently selected from the group consisting of:

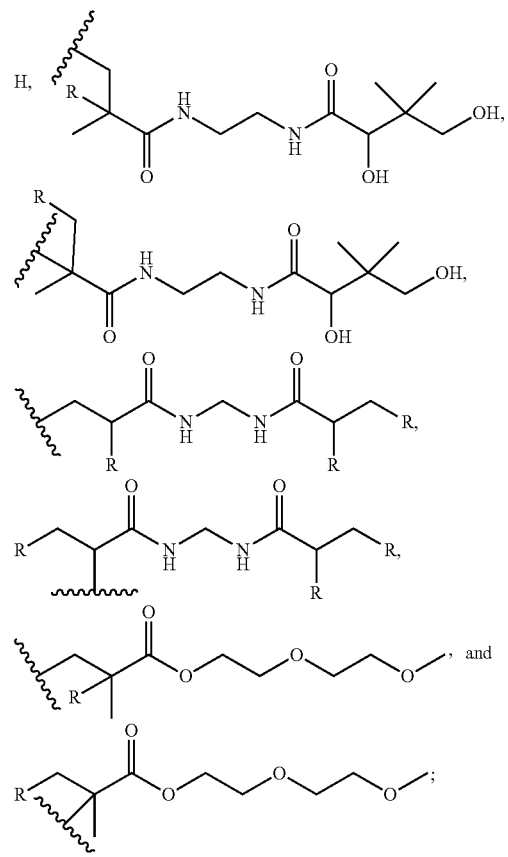

wherein each R represents a linkage to another Y selected from the group, so as to provide a matrix structure.

In another embodiment of any of the above hydrogel or hydrogels, the hydrogel may comprise a co-polymer of B5AMA and DEGMEM, cross-linked with Bis.

In an embodiment, the hydrogels may be provided in a dried or lyophilized form, or may be provided with at least some water or other fluid therein.

The present invention will be further illustrated in the following examples.

Example 1: Water Recycling Efficacies of Hygroscopic, Antifouling Hydrogels

Reusable antifouling, water-harvesting hydrogels have found various applications in the field of nanotechnology, biomedicine, in food industry and in agriculture. These water-releasing materials are generally comprised of hygroscopic natural polymers, such as alginate blended with ionic salts or thermo-responsive moieties, to aid the release of water from the network of hydrogels. A strategy to develop synthetic, hygroscopic hydrogels (in the absence of ionic salts or thermo-responsive moieties), capable of absorbing copious amount of water and allow the facile release of water at ambient temperatures, as a function of crosslinking density of the polymer chains, is disclosed herein. The first step in the development of hygroscopic hydrogels is the development of hygroscopic vitamin B5 analogous or pantothenic acid analogous monomer (B5AMA), by ring opening chemistry. The hygroscopic hydrogels are then prepared from B5AMA monomer at different cross-linker densities by free radical polymerization approach and are evaluated for their antifouling properties and for their water absorbing and release efficacies, as a function of temperature. The release of significant amount of water by B5AMA hydrogels at physiological temperature (37° C.), their repeated water absorption and desorption behavior and excellent antifouling properties, indicate their potential usage as water harvesting materials in arid regions, for example.

The water harvesting materials are capable of carrying copious amount of water and releasing the water in the presence of external stimulus. The hydrogels may have the ability to undergo repeated cycles of absorption and desorption and may possess multiple applications in agriculture, such as water harvesting and in household appliances, for example in dehumidifiers.[4,6-7] Some hydrogels studied for water absorption and release efficacies are summarized in Table 1.

TABLE 1

Water absorption and release efficacies of different hydrogels

| Hydrogel Material | Phase of water absorbed | Temperature required for water release (° C.) | % water released | Reference |
|---|---|---|---|---|
| B5AMA | Liquid | 37 | 15 | This work |
| CaCl$_2$ and alginate | Moisture | 100 | 90 | [6] |
| Poly (N-isopropyl methacrylamide) and alginate | Moisture | 50 | 15 | [7] |
| Poly-ionic liquids and poly (N-isopropyl methacrylamide) | Liquid | 50 | not indicated | [5] |

Herein, a method to develop pantothenic acid analogous monomer (indicated as vitamin B5 based monomer or B5AMA) by ring opening chemistry is disclosed. The synthesis of B5AMA in reasonable yield encouraged the subsequent development of B5AMA analogous hydrogels of various crosslinking densities, by a free radical polymerization method. The hydrogels of B5AMA of varying cross-linking densities produced were analyzed by x-ray diffraction analysis (XRD), thermogravimetric analysis (TGA) and were evaluated for their water absorption and release efficacies as a function of hydrogel cross-linking density and temperature. Herein is reported a synthesis of the pantothenic acid analogous monomer, and the preparation of the corresponding hydrogels and their physiochemical properties (cross-linking density of hydrogels). The water release efficacies of these materials is also included herein.

Presented herein is a set of hydrogels synthesized from vitamin B5 analogous methacrylamide monomer, termed as B5AMA, which may be capable of carrying large amount of water (more than 90% of their own weight) and may repeatedly absorb and desorb significant amount of water at ambient (37° C.) temperature, for example. In comparison to the existing water harvesting materials, which require high temperatures (50° C. and above) for the optimized water release from hydrogels,[5-7] the harvesting of water at low temperature (37° C.) may be a more economical method. Desorption at lower temperatures may reduce energy consumption of a system for supply clean water on demand.

Figure 5:
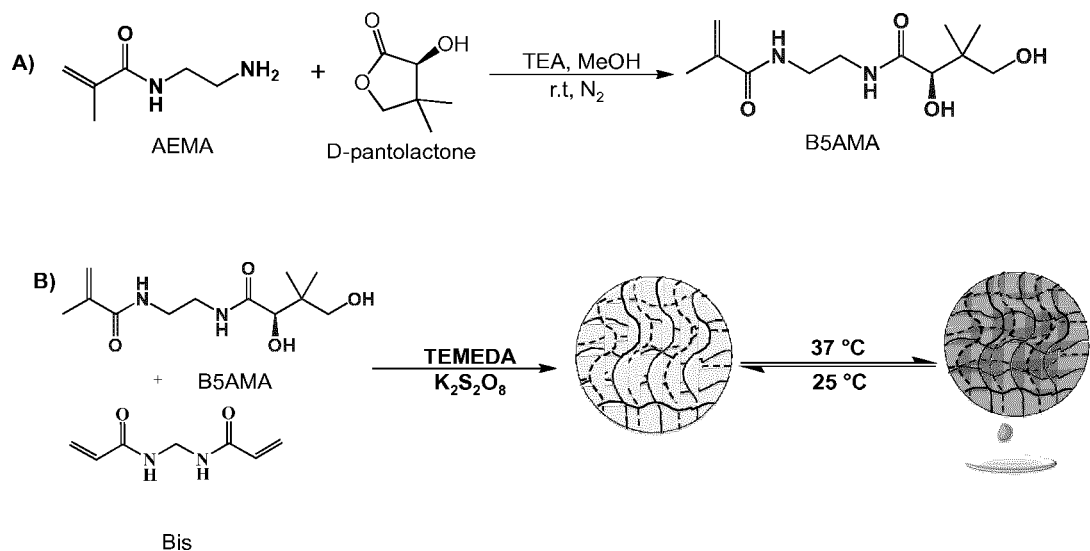
FIG. 5A is a schematic depicting the synthesis of pantothenic acid analogous monomer (B5AMA)
FIG. 5B is a schematic depicting the synthesis of B5AMA hydrogels, in the presence of N',N'-methylene bisacrylamide (Bis) and their water absorption and release behaviour at ambient temperatures.
Figure 6:
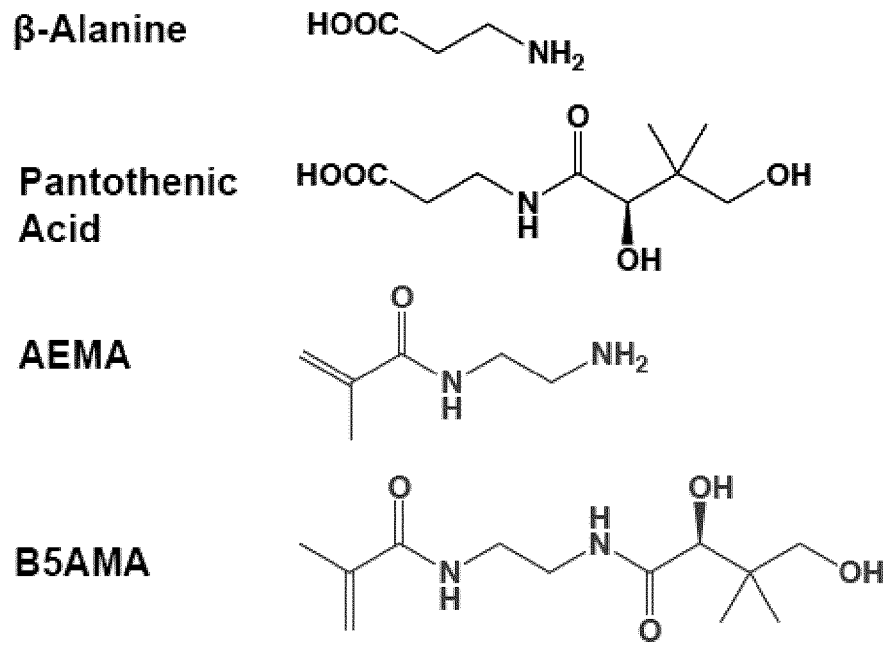
FIG. 6 depicts chemical structures of β-Alanine, pantothenic acid, 2-aminoethylmethacrylamide (AEMA) and vitamin B5 analogous monomer (B5AMA)
Figure 7:
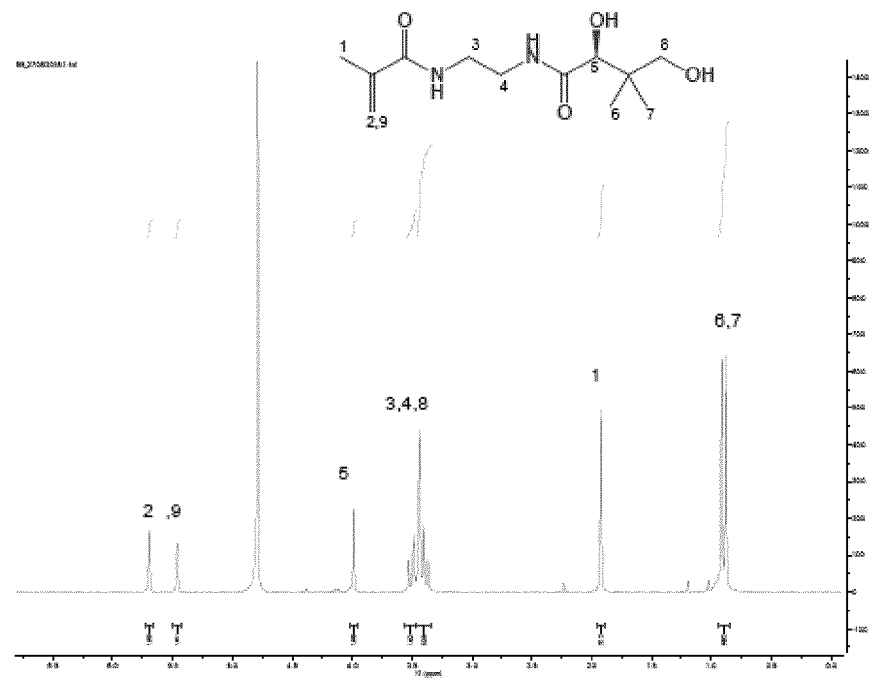
FIG. 7 shows a $^1$H-NMR spectrum of B5AMA in $D_2O$.
Figure 8:
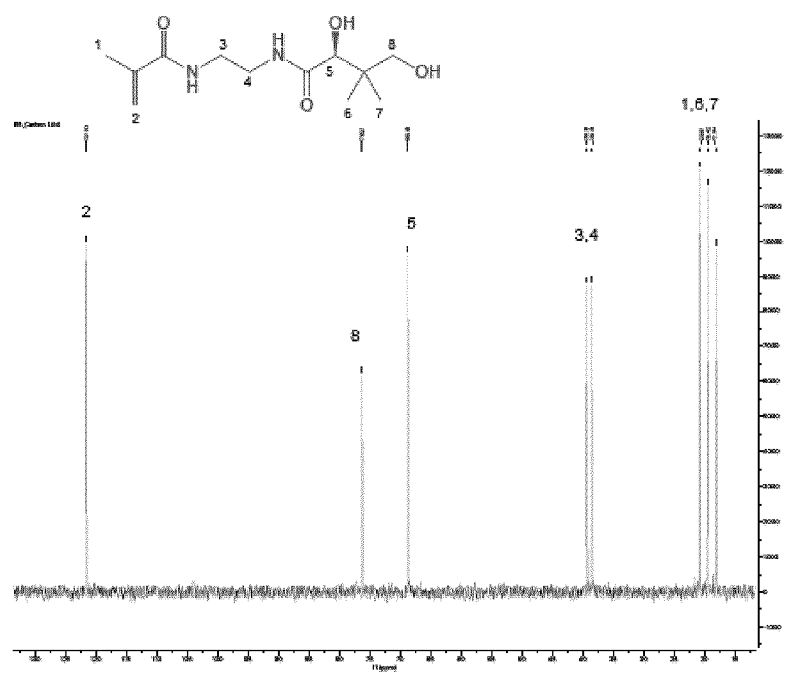
FIG. 8 shows a DEPT 45 $^{13}$C-NMR spectrum of B5AMA.

The first step in the synthesis of hydrogels is the synthesis of the monomer B5AMA. 2-aminomethacrylamide (AEMA) a cationic monomer, a methacrylamide analogue of β-alanine, was selected to develop pantothenic acid analogous monomer for its subsequent polymerization in the form of hydrogels (FIG. 6). The replacement of carboxyl group of β-alanine in the form of methacrylamide moiety of AEMA may yield polymerization capability along with other interesting potential applications (such as antibacterial and antifouling properties) to the resultant biomaterials.[11-12] AEMA was synthesized according to the previously established protocol[16] and was used to prepare B5AMA monomer by facile ring opening chemistry, under inert atmosphere (FIG. 5). The synthesis of B5AMA monomer was confirmed by $^1$H-NMR, and $^{13}$C-NMR spectroscopy (FIGS. 7 and 8).

To accomplish the synthesis of highly hygroscopic hydrogels, purified B5AMA monomer was subsequently chemically cross-linked in the presence of cross-linker, N',N'-methylene bisacrylamide, to yield pantothenic acid analogous hydrogels of varying cross linking densities (Table 2, FIG. 5). The chemically cross-linked hydrogels prepared were then tested for their water retention capacity, as a function of hydrogel crosslinking density (Table 2, FIG. 1A).

TABLE 2

The depiction of experimental conditions and gelation times recorded for the synthesis of B5AMA hydrogels. The measurement of water retention and water release capacity of hydrogels at 37° C., as a function of their cross-linking density.

| Sample | [Monomer] [M] | Cross-linker (mol %) | Gelation Time (minutes) | Water Absorbed (g) | Water released (%) @ 37° C. |
|---|---|---|---|---|---|
| B5AMA-5 | 0.78 | 5 | 15 | 0.1935 ± 0.013 | 5.2 ± 1.71 |
| B5AMA-10 | 0.78 | 10 | 15 | 0.512 ± 0.067 | 15 ± 3.27 |
| B5AMA-20 | 0.78 | 20 | 15 | 0.468 ± 0.049 | 0 |

The water retention capability of hydrogels is generally a function of monomer type and the increase in cross-linking density of hydrogels is reported to reduce their swelling/water absorbing capacity due to the increase in mechanical strength (stiffness) of hydrogels.[17] Others have suggested that presence of optimum amount of cross linker in polymeric architecture is required to prevent the dissolution of polymer chains and hence increases the swelling capacity of the hydrogels up to a critical cross linker concentration, however further increase in cross linker concentration may have negative effects on water retention efficacy of hydrogels.[18] Reported herein is an optimum concentration of cross-linker to achieve maximum water retention capacity of B5AMA hydrogels. The increase in crosslinking density from 5 to 10 mol % in B5AMA hydrogels, increased the water absorption capacity of hydrogels from 59 to 90%, respectively. However, any further increase in cross linker concentration may lead to the reduction in water holding capacity. Water retention efficacy of B5AMA-20 was reduced to 72% when cross-linker concentration was increased (FIG. 1a). Passauer et al. attributed the reduced swelling capability of lignin based xerogels to the small pore volume, and to the stronger polymer-polymer interactions of highly cross-linked hydrogel architecture, which may subsequently result in lower polymer-solvent interactions.[19]

The bound water in hydrogels may exist in the form of polarized molecules around charged groups or oriented around the polar groups via hydrogen bonding. B5AMA hydrogels may contain negligible if any charged groups (sulfate groups on the initiating chains), hence we expect that most of the absorbed water is held by hydrogen bonding around polar groups, such as by the amide and alcohol functional groups. In a recent report, polyionic gels of excellent water absorption efficacies (>90%) have shown the optimum release of water, upon heating at 50° C.[5] The superior water absorption capacity of synthesized B5AMA hydrogels via hydrogen bonding encouraged us to study their water release profiles, as a function of temperature and cross linker density. The B5AMA hydrogels of various cross-linking densities were incubated at different temperatures and amount of water released as a function of temperature was studied (Table 2, FIG. 1b).

The data reveals that the increase in temperature and crosslinking density (from 5-10 mol % of cross linker), may increase the amount of water released from the hydrogels, however further increase in crosslinking density of hydrogels may have a negative effect on the water release behavior of hydrogels. Jacobson et al. have reported the thermal release of water from poly(methyl vinyledenecyanide) by UV laser assisted thermal desorption and showed that mild changes in solution temperature due to UV radiation, resulted in the diffusion of weakly bound water from poly (methyl vinyledenecyanide). The increase in water release efficacies of poly(methyl vinyledenecyanide) at higher temperature may be associated with the loss of strongly bound water from the polymeric architecture.[2] The strikingly similar water release behavior was observed when B5AMA-10 was heated from room temperature to 37° C., leading to the release of weakly bound water (0.1 g/g of hydrogels) from three-dimensional nano-pockets of hydrogels. The further increase in temperature to 60° C. increased the water content (to 0.4 g/g), possibly due to the release of strongly bound water from the hydrogel sample. The densely cross-linked hydrogels (B5AMA-20), however exhibited poor water release efficacies, despite high swelling capacities (72%) in deionized water (FIGS. 1A, 1B). The water release of B5AMA-20 was negligible at 37° C. and less than 0.01 g/g water (~9% of total absorbed water) was collected at 60° C.

Figure 9:
FIG. 9 is a photograph of B5AMA-10 hydrogels (left) before the release of water at 25° C., and (right) after the release of water at 37° C.

Without wishing to be bound by theory, we hypothesize that the slightly unrestricted movement of polymer chains in cross-linked hydrogel samples of B5AMA-5 & B5AMA-10, permit the inter and intramolecular hydrogen bonding between polymer chains and water molecules, hence allowing the facile and reversible uptake and release of water under physiological condition. Although, the lower cross-linking density of B5AMA-5 may yield lower water absorption and release efficacies (5% of the total absorbed water), the incubation of B5AMA-10 at 37° C. released 15-18% of total water content absorbed by the hydrogel at room temperature (FIG. 1c). The rearrangement of B5AMA-10 polymeric chains as a function of temperature was visualized by the slight reduction in the diameter (1.3 cm to 1.1 cm) and by the change in opacity of hydrogels (FIG. 9). The reduced water release behavior of B5AMA-20 may stem from smaller pore sizes, and the restricted flexibility of polymer chain in hydrogel architecture, which in turn results in poor water release efficacies of B5AMA-20.

Figure 2:
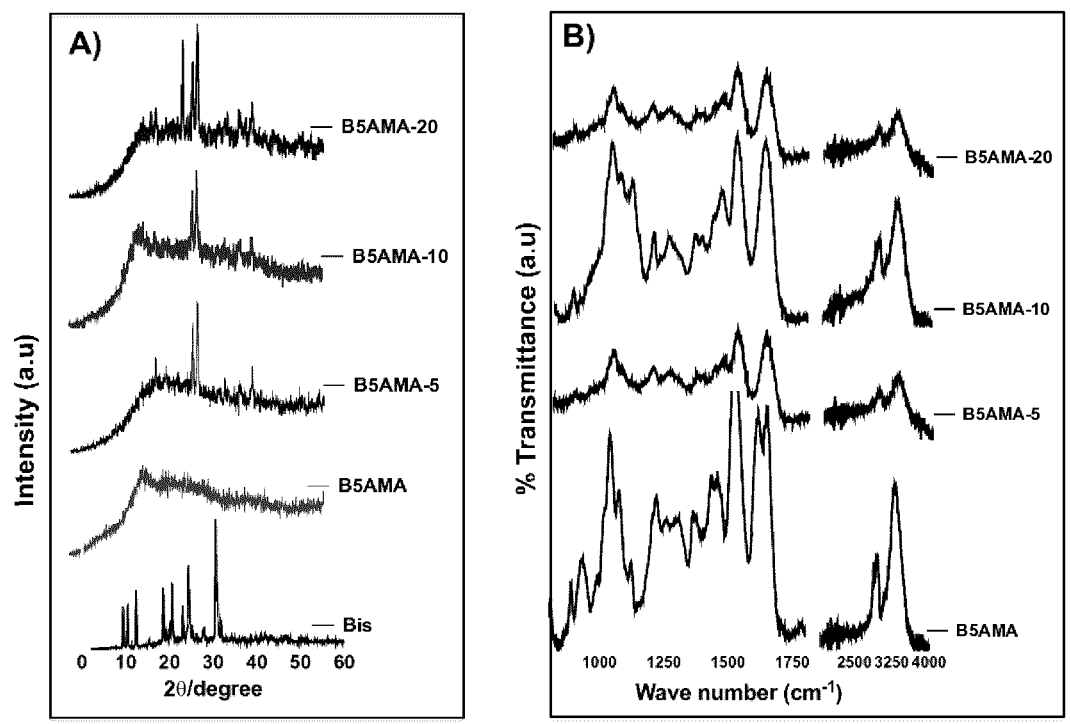
FIG. 2A depicts an XRD pattern of N',N'-methylene bisacrylamide, B5AMA monomer and their hydrogels, prepared at various crosslinking densities.
FIG. 2B depicts FTIR spectra of B5AMA monomer, and its corresponding hydrogels prepared at various cross-linking densities.

The physical characterization of hydrogels was performed to elucidate the details of crosslinking density of hydrogels and their impact in water release behavior. The changes in physical structure of monomer upon crosslinking with various concentrations of N',N'-methylene bisacrylamide, were studied by XRD patterns. As expected, the presence of well-defined peaks at 2Θ=9.25°, 12.3°, 18.7°, 20.6°, 23.1°, 24.3°, and 30.6°, in XRD revealed strongly crystalline behavior of N',N'-methylene bisacrylamide, while pantothenic acid analogous monomer B5AMA, showed completely amorphous structure, which is indicated by broad featureless peak at 2Θ=18-40° (FIG. 2a). The freeze-dried gels prepared at various cross-linked densities maintained the amorphous behavior of B5AMA monomer and a few crystalline peaks corresponding to the structure of the cross-linker appeared around 2Θ=30° (FIG. 2a). This data is in agreement with other reports, where blended materials prepared with high concentrations of amorphous substances in the presence of crystalline structures, resulted in highly amorphous materials, with only few peaks corresponding to crystalline structures of the starting material.[20-21]

The presence and availability of polar functional groups in B5AMA monomer and in the corresponding hydrogels was then evaluated by ATR-FTIR spectroscopy. FTIR analysis confirms the presence of hydroxyl and amide bonds in the monomer and in the hydrogel structures. The data reveals the presence of intense and broad band at 3282 cm$^{-1}$ originating from stretching of OH groups of B5AMA. The vibrational stretching at 1647 cm$^{-1}$ is attributed to C=O signal of amide bond. The strong stretching at 1050 cm$^{-1}$ represents C—O of alcohols and C—N bonds exhibit medium stretch at 1127 cm$^{-1}$. The band at 2923 cm$^{-1}$ is assigned to asymmetric C—H stretches (FIG. 2b). The presence of hydroxyl stretch at 3282 cm$^{-1}$, the C—O stretch at 1050 cm$^{-1}$, and carbonyl signal from amide bonds at 1647 cm$^{-1}$, suggests the availability of polar groups for water absorption. The strength of % transmittance signal arising from hydroxyl stretch and from other functional groups of the un-crosslinked monomer and of B5AMA-10 is noteworthy and may indicate either the greater concentration of polar groups or their the higher polarity/availability in B5AMA-10, as compared to the other hydrogels[22] (FIG. 2b). ATR-FTIR further suggests that greater availability of polar groups in 10% cross-linked hydrogels may have resulted in superior water molecule binding and release efficacies at optimized temperature.

The thermal stability of hydrogels is an important parameter and may offer an insight on the water retention and release efficacies of hydrogels. The thermal stability of hydrogels was investigated by TGA. The strikingly different thermal decomposition behavior of B5AMA-10, in comparison to B5AMA-5 and B5AMA-20, suggest higher thermal stability of B5AMA-10 at lower temperatures, possibly due to the presence of significant amount of entrapped moisture in B5AMA-10 sample. B5AMA-10 showed a three step degradation profile. The 10% weight loss during the first step occurs upon heating from 50-200° C. and indicates the moisture loss from the polymer chains. The second step contributes to the 50% weight loss of B5AMA-10 upon heating from 210-400° C. and is contributed by the thermal decomposition of bulk hydrogel architecture, due to the disruption of both covalent bonds and hydrogen bonds between polymer chains of the hydrogel. The third step is indicated by a sharp weight loss at 400° C. indicating the degradation of polymeric chains. In contrast, the TGA curves of B5AMA-5 & B5AMA-20 showed step-wise sequential weight loss and lower stability, than B5AMA-10 especially at lower temperatures (50-250° C.), indicating the role of moisture and hydrogen bonding in the hydrogel of B5AMA-10. The slower degradation rate and higher stability of B5AMA-5 & B5AMA-20 may reflect their densely cross-linked structures, in comparison to B5AMA-10 hydrogel.[23-24]

Figure 3:
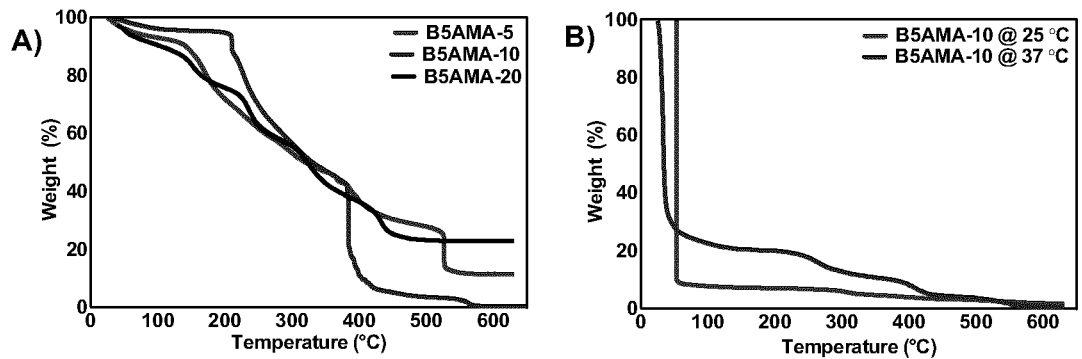
FIG. 3A depicts TGA analysis of freeze-dried B5AMA hydrogels, prepared at various cross-linker concentrations.
FIG. 3B depicts TGA analysis of B5AMA-10 before (25° C.), and after the release of water at 37° C.

To further explore the water release efficacies of B5AMA-10, TGA analysis was performed before and after the release of water. The water laden B5AMA-10 hydrogels, when heated to 53° C., exhibit rapid weight loss (>90%), indicating that more than 90% of the weight of hydrogel was in the form of water and the cross-linked polymeric chains of pantothenic acid comprised less than 10% of weight of the sample, which were degraded at higher temperatures (between 400-600° C.). (FIG. 3b) In contrast, TGA curve of B5AMA-10 obtained after the in vitro release of water at 37° C. exhibited up to 73% of weight loss at 53° C., which shows that B5AMA-10 can carry ~18% water in recyclable form at 37° C. and this water can be retrieved by slight heating of gel from room temperature (22° C.) to 37° C. The TGA analysis strongly complemented our in vitro water release data obtained and discussed above in FIG. 1, and reinforced that 15-18% of water absorbed by B5AMA-10 is in recyclable form and is accessible upon constant heating the hydrogel at 37° C. The heating of B5AMA-10 at higher temperature showed two distinct curves between 200-300° C. due to the loss of remaining moisture, disruption of hydrogen bonding and 300-400° C. for the degradation of polymeric chains.

Figure 4:
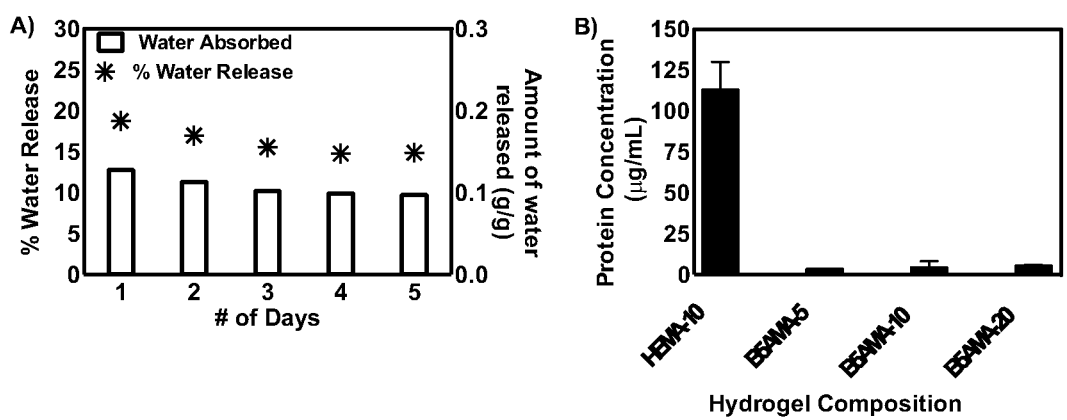
FIG. 4A shows the repeated cycles of water absorption and desorption for B5AMA-10 hydrogels for period of five days.
FIG. 4B depicts a comparison of antifouling properties of HEMA and B5AMA hydrogels, prepared at different cross-linker concentrations.
Figure 10:
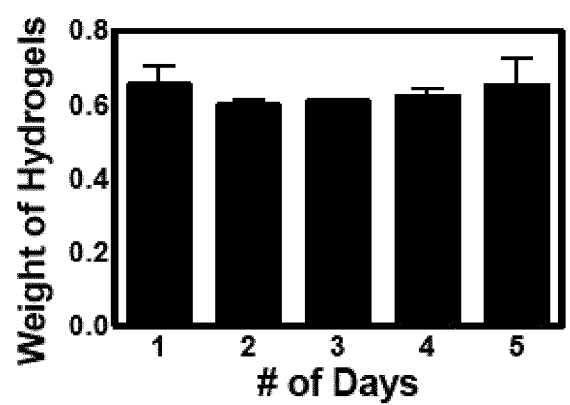
FIG. 10 is a bar graph depicting weights of B5AMA-10 hydrogels recorded during the release of water during repeated cycles of water absorption and desorption for the period of five days.

The repeated absorption and desorption of known amount of water in hydrogels in multiple cycles, ensure the reproducibility of the data, recyclability of the material and its potential applications in various fields of nanotechnology and bioscience.[6-7] We performed repeated cycles of water absorption and desorption, by hydrating B5AMA-10 hydrogel samples at room temperature, followed by the release of water at 37° C. The hydration/dehydration cycle consist of 3 phases: 1) Absorption of water at room temperature for 1 hour 2) desorption of water while heating at 37° C. for 24 hours followed by 3) absorption of water at room temperature for 1 hour. The cycles were repeated for 5 days, and 15-18% of the absorbed water was collected after each cycle, as shown in FIG. 4. It should be noted that any change in the weight of gel or physical deformities of hydrogel were not observed for the period of time studied, thus further supporting the recyclability of our materials (FIG. 10). The amount of water released from B5AMA-10 at 37° C. (15-18%) is comparable to the reported release of water from alginate based hydrogels (~20% at 50° C.) and hygroscopic nature of polymeric chains is suggested to prevent the further release of remaining water content from the hydrogels architecture.[7] The water release behaviour of B5AMA-10 hydrogels at ambient temperature (37° C.) may provide highly efficient energy exchange system with applications in water harvesting and in house hold appliances such as dehumidifier and sensor, for example.[4,7-8]

Pantothenic acid modified materials may have antifouling properties.[11-12] The pantothenic acid analogous hydrogels synthesized were further evaluated for their antifouling properties.[11,12] The antifouling properties of B5AMA hydrogels were evaluated by measuring the absorption of bovine serum albumin (BSA) in the three dimensional architecture hydrogels, followed by the release of BSA and its detection by BCA assay. The superior capability of hydrogels to absorb bioactive molecules such as peptides and proteins and their controlled release in the presence of external stimulus are documented in the literature.[25] 2-hydroxyethyl methacrylate (HEMA) based non-ionic hydrogels are well-explored for the delivery of small peptides and proteins for ocular therapies, and were used as a positive control for this study.[23] The data reveals that B5AMA based hydrogels showed negligible protein absorption, after the 24 hour incubation with bovine serum albumin (BSA) solution. This antifouling behavior of B5AMA hydrogels was not related to their cross-linking density and was attributed to the properties of the material itself. In contrast, HEMA based hydrogels, prepared under similar conditions, showed significant absorption and release of BSA protein. This data suggests that novel pantothenic acid analogous synthetic materials maintain inherent antifouling properties of pantothenic acid.

Figure 14:
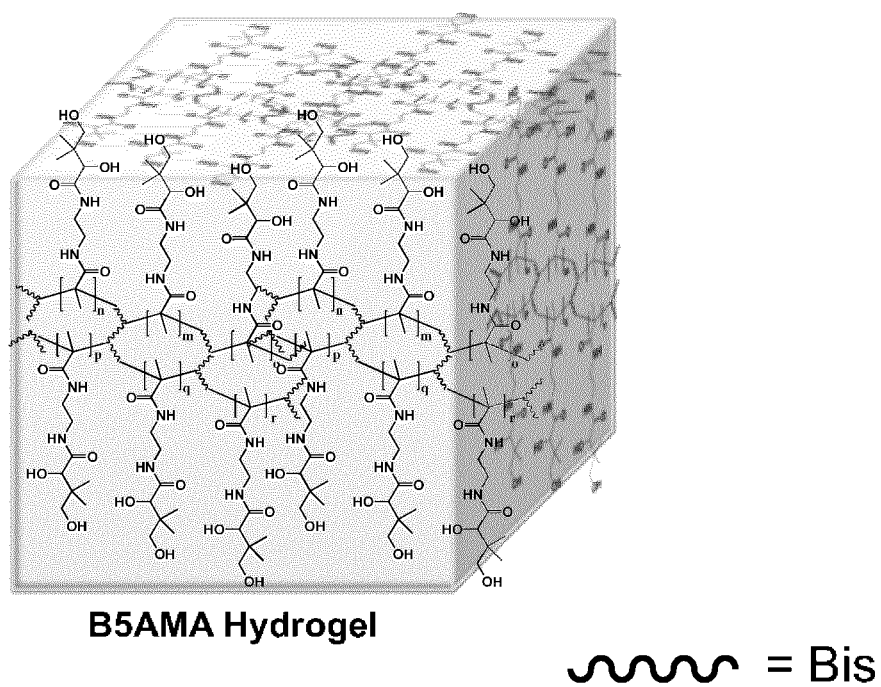
FIG. 14 is an illustration depicting an example of a hydrogel comprising B5AMA monomers and Bis cross-linkers.

Pantothenic acid analogous monomer, B5AMA and its corresponding hydrogels were prepared at 5, 10 & 20 mol % crosslinking density. The B5AMA based hydrogels prepared by free radical polymerization method showed excellent water retention and release efficacies, as a function of cross-linking density and temperature. The water release behavior (15-18% of the total absorbed water) of hydrogels prepared at 10% crosslinking density may be associated with optimized three dimensional network of hydrogels, which provides greater availability of polar functional groups and allows flexible polymer chain movement in the hydrogel architecture, hence supporting water absorbance and release behavior. The inter- and intra-molecular interactions of polymer chains in B5AMA-10 hydrogel networks is visible by the slight changes in hydrodynamic diameter and opacity of the hydrogels at different temperatures. Moreover, the antifouling properties and the repeated cycles of water absorption and desorption in hydrogels suggest their applications and reusability in, for example, the nanosensors, biotechnology, agriculture, and in food industry. An exemplary illustration of a hydrogel comprising B5AMA and N,N'-methylenebisacrylamide is shown in FIG. 14.

Hydrogels disclosed herein may absorb water at room temperature and can recycle some of the bound water upon heating to body temperature (for example). The amount of water that can be recycled may increase with the increase in heating temperature. This indicates a relatively low energy requirement. Moreover, the hydrogels resist the attachment of proteins on its surface, as all living materials are made up of proteins, the system may be used to absorb clean water from foul water resources, repelling bacteria, viruses and other microorganisms away from stored water.

Embodiments may have the ability to absorb and retain copious amount of water in the gels. These hydrogels may absorb up to about 90% of water, comparable to their own weight and can retain this water (without substantial evaporation/water loss) for long period of time at room temperature (25° C.). They may possess the ability to release the water upon the supply of minimal amount of heat (e.g. body temperature or 37° C.), which indicates low energy expenditure of this system and supports translation into energy efficient water recycling systems. The hydrogels may be able to resist the attachment of proteins on their surface. This is applicable to water purification. These hydrogels may resist the attachment of proteins (which is usually the first point for bacterial/viral contamination) on their surface and hence may be used absorb only clean water from natural resources, leaving bacteria or other microorganisms out of the gels.

The hydrogels produced may be reused multiple times, without any visible change or loss in shape or weight of the gels and may be used for extended period of times as water recycling/purification units.

Experimental Procedure:

Materials: Triethylamine (TEA), anhydrous methanol, potassium persulfate (KPS), N,N,N',N'-tetramethylethylenediamine (TEMEDA), and N,N'-methylenebisacrylamide (Bis) were purchased from Sigma-Aldrich. Pantolactone was purchased from Oakwood Chemicals. 2-aminoethyl methacrylamide (AEMA) was synthesized according to previously established procedure.[16] Acetone, and ethyl ether were purchased from Fisher Scientific.

Synthesis of B5AMA: 23 mmoles of AEMA were dissolved anhydrous methanol (4 mL) in the presence of triethylamine (20 mL) under inert atmosphere and the mixture was stirred for 3 hours at room temperature to obtain homogenous solution. 20 mmoles of pantolactone were then added and the reaction was allowed to proceed overnight under inert conditions at room temperature. The solution was precipitated in acetone and the white precipitates of triethylamine hydrochloride were filtered. The B5AMA monomer was purified from the filtrate by silica column chromatography, using acetone as an eluent. The eluent was concentrated and was precipitated in ethyl ether to obtain the final product in the form of pure yellowish oil with 65% yield. The purified B5AMA was analyzed by $^1$H-NMR and $^{13}$C-NMR using Bruker 300 MHz NMR. $^1$H-NMR ($D_2O$, ppm): δ 0.79 (s, 3H, $CH_3$), 0.83 (s, 3H, $CH_3$), 1.8 (s, 3H, $CH_3$), 3.35 (m, 6H, $CH_2$), 3.9 (s, 1H, CH), 5.4 (s, 1H, C=$CH_2$), 5.6 (s, 1H, C=$CH_2$). DEPT-45 spectrum of $^{13}$C-NMR ($D_2O$, ppm): δ 17.9, 19.4, 20.8, 38.4, 39.3, 68.7, 78.2, 121.6

Synthesis of B5AMA Hydrogels: B5AMA based hydrogels were prepared by free radical polymerization method. Briefly, the monomer, B5AMA (0.78M), initiator KPS (10 µM) and the cross-linker N,N'-methylenebisacrylamide (Bis) (5-20 mol %) were dissolved in distilled deionized water and the solution was degassed for 5-10 minutes, followed by the addition of catalyst, TEMEDA (20 µL). B5AMA hydrogels were prepared at various mol % s of cross-linker, as shown in table 2. The formation of hydrogels was confirmed by vial inversion test and the gelation time was recorded. The hydrogels obtained were washed three times with deionized water and were dried to obtain pure hydrogel samples. The gravimetric weight of dried hydrogels (10 mol % cross-linked) was compared with the weight of monomer used for hydrogel synthesis and percent monomer conversion was calculated to be 59%.

Water Release Measurements: The hydrogels of various cross-linking densities and of spherical shape (area 1.33 cm$^2$, dimension; diameter 1.3±1 cm and height 0.35±0.5 cm) were prepared and water release from hydrogels was measured as a function of time and temperature. Briefly, water-laden hydrogels of varying crosslinking densities (5, 10, & 20 mol %, termed as B5AMA-5, B5AMA-10 & B5AMA-20, respectively) and of initial gravimetric weights 0.342±0.012, 0.575±0.07, and 0.541±0.032 (for B5AMA-5, B5AMA-10 & B5AMA-20, respectively) were incubated at 25, 37 and 60° C. in triplicates and water released was collected for the period of 24 hours.

Amount of water released was measured as follows:

$$\text{Amount of water released in gram per gram of hydrogel} = W_R/W_G \quad (1)$$

Where, $W_R$ was the weight of released water by each hydrogel and $W_G$ was the initial weight of hydrogels before water release. The amount of water absorbed by hydrogels was determined by measuring the difference in the weights of freeze-dried hydrogels and of water laden hydrogels.

The percent release of water from the hydrogels was measured as follows:

$$\% \text{ water release from hydrogels} = (W_R/W_L) * 100$$

where, $W_R$ is the weight of water released by each hydrogel and $W_L$ is the total amount of water absorbed in the hydrogels sample. The tests were repeated at least twice to ensure the reproducibility of the data.

Characterization Techniques:

Powder X-ray Diffraction (XRD): XRD was performed with a Bruker AXS D8 Advance instrument, which was equipped with a graphite monochromator, variable divergence slit, variable anti-scatter slit and a scintillation detector. Cu (Kα) radiation (λ=1.524 Å) was used and the measurements were performed in air at room temperature from 2-60° (2θ). Lyophilized samples were milled to powder and deposited on double sided scotch tape, which was mounted to glass slides.

Thermo-gravimetric Analysis (TGA): Thermal decomposition profiles of the synthesized materials were acquired by TGA. Experiments were performed on a TA Instruments TGA Q500 in Ramp mode under a compressed air atmosphere up to 650° C., using platinum pans at a heating rate of 10° C./min. Samples were lyophilized, milled to powder and immediately analyzed.

Attenuated Total Reflection Fourier Transform Infrared (ATR-FTIR): ATR-FTIR was performed on a Bruker Alpha-T single reflection Attenuated ATR module equipped with a platinum-Diamond crystal. Samples were lyophilized, milled to powder and immediately analyzed. Spectra were collected from 16 scans per sample and subtracted from a background spectra, between 375-4000 cm$^{-1}$ at a resolution of 0.9 cm$^{-1}$.

Evaluation of Protein Absorption: The protein absorption capacity of hydrogels was measured as follows: Briefly, duplicates of hydrogels were incubated with bovine serum albumin (BSA) (750 µg/ml) in PBS Buffer (pH 7.4) for 24 hours. The supernatant was discarded and hydrogels were washed with PBS 3×, and were immersed in PBS for 24 hour to release any imbibed protein. The supernatant was then analyzed for the presence of BSA, using BCA assay, according to the manufacturer's protocol.

Example 2: Co-Polymerization of the B5AMA Monomer with Other Monomers

Figure 11:
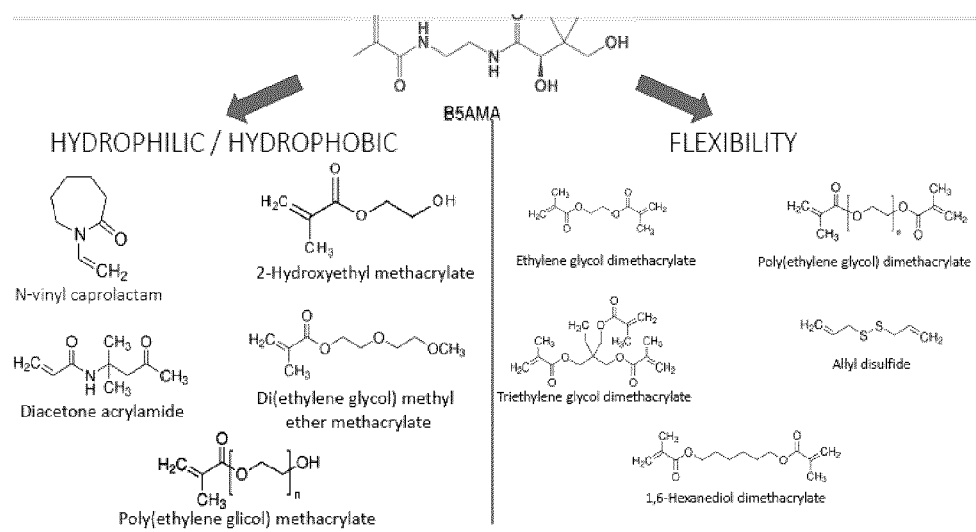
FIG. 11 is a schematic depicting a list of hydrophilic/hydrophobic co-polymer monomers and flexible cross-linkers.
Figure 12A:
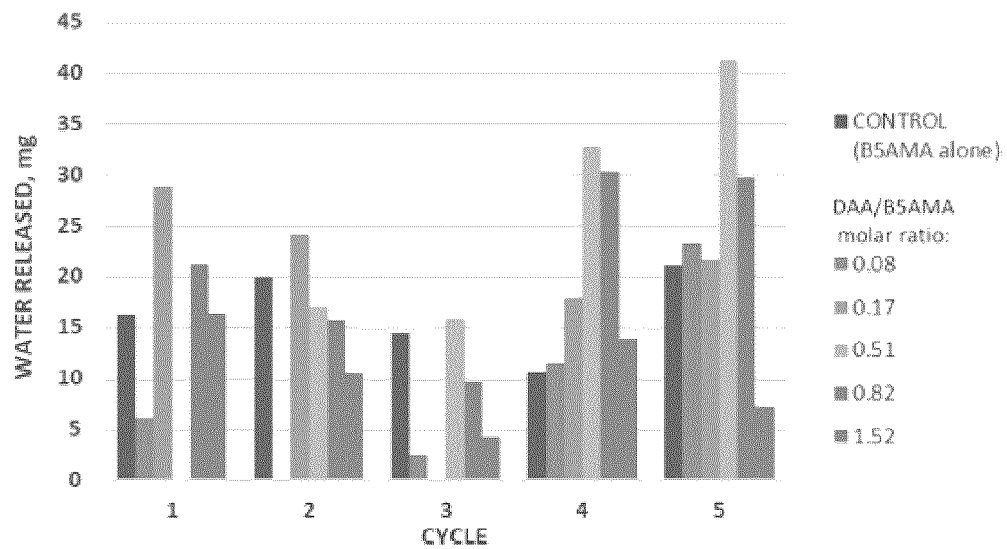
FIGS. 12A-12G are bar graphs depicting water release profiles (mg) of various hydrogel co-polymer compositions, including DAA (FIG. 12A), PEGM (n=11) (FIG. 12B), HEMA (FIG. 12C), NVC (FIG. 12D), and DEGMEM (FIG. 12E-G) monomer co-polymers.
Figure 12B:
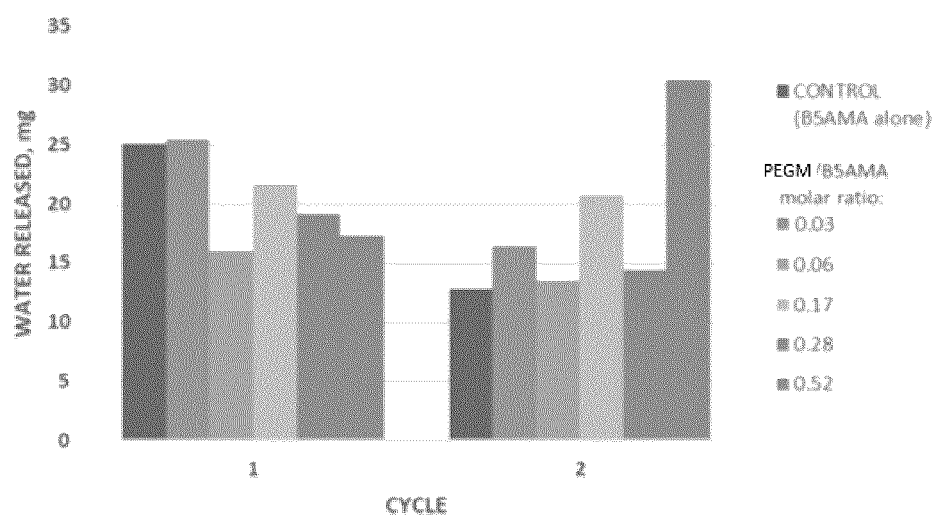
Figure 12C:
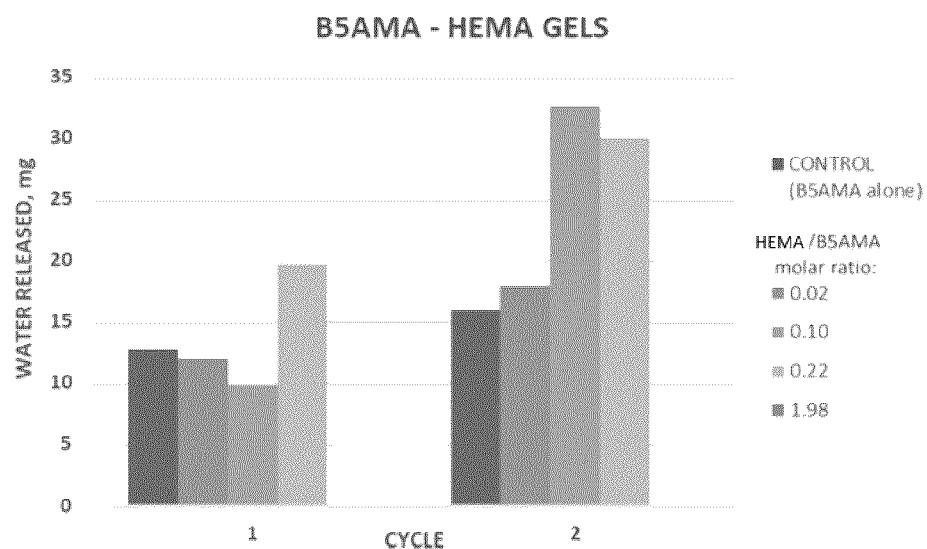
Figure 12D:
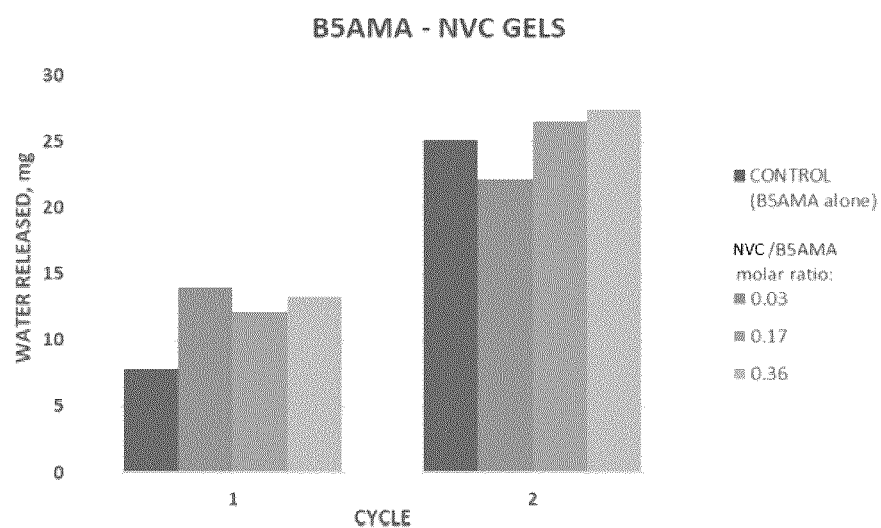
Figure 12E:
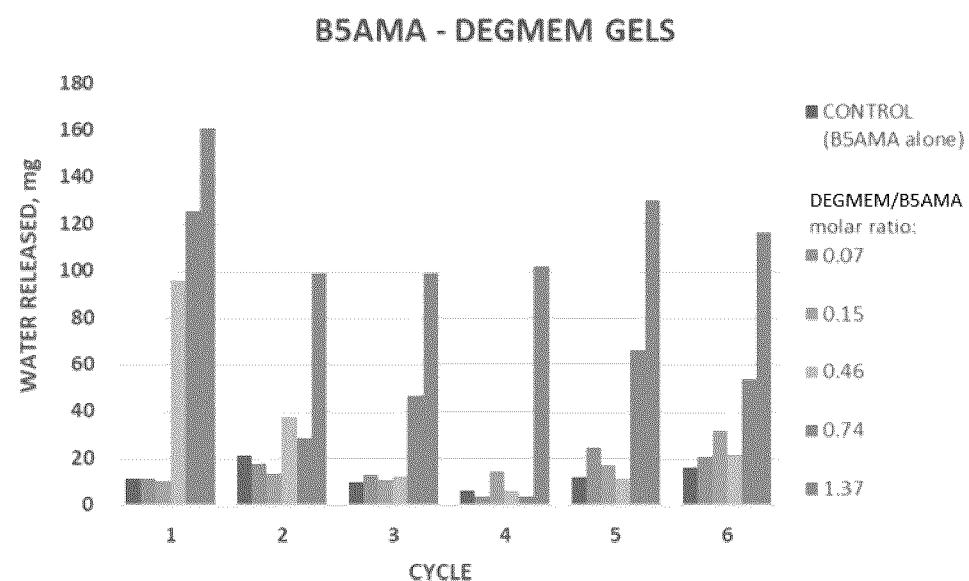
Figure 12F:
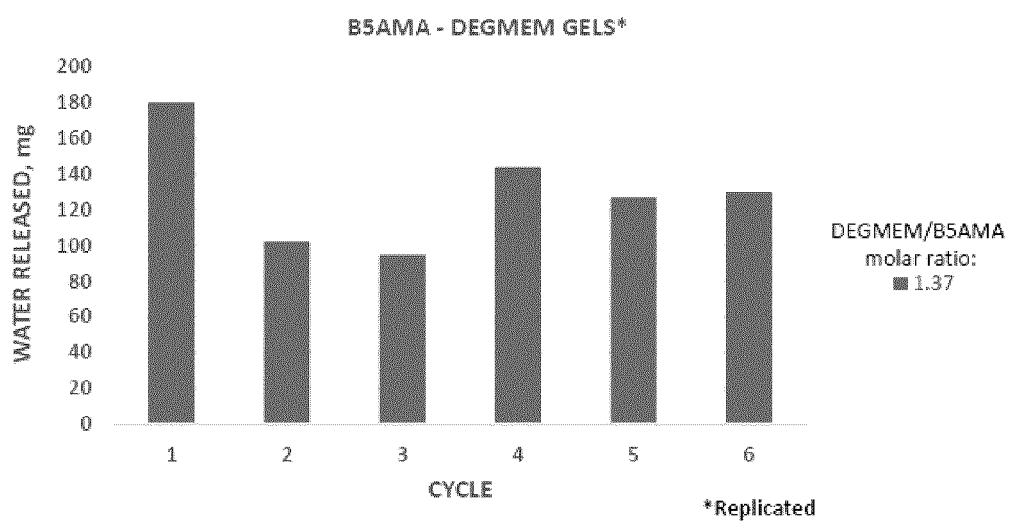
Figure 12G:
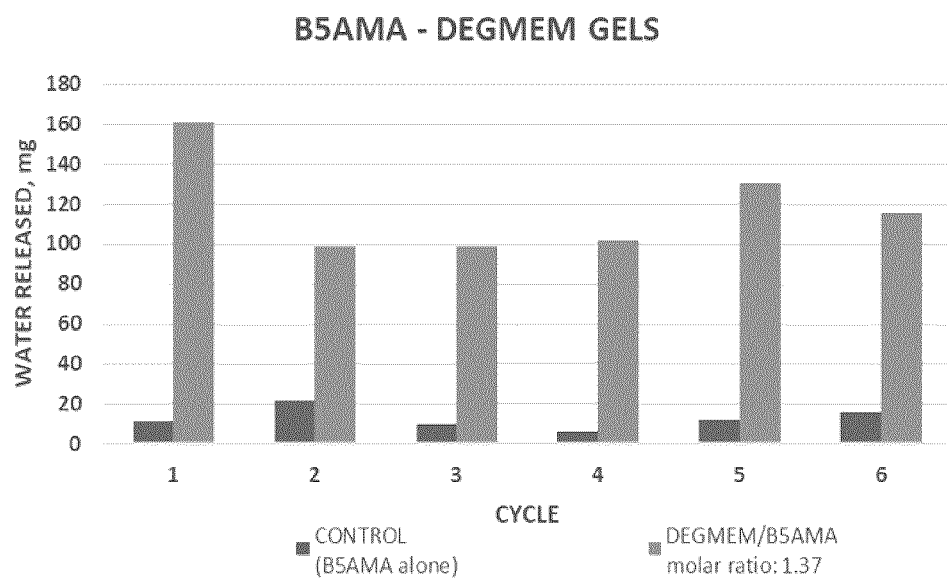

Experimental details for the water absorption/release properties of B5AMA hydrogels are shown in the previous examples. In this example, the hydrophilic/hydrophobic balance of the polymer is changed by varying the ratio of monomer and cross-linker and by adding additional monomers to form a cross-linked co-polymer (FIG. 11). This work demonstrates copolymerization of the B5AMA monomer with a set of different monomers at different molar ratios to obtain hydrogels with water recycling properties. Table 3 lists the co-monomers tested to date for this purpose. The testing data is shown in FIGS. 12A-G.

TABLE 3

| List of co-monomers |
| --- |
| Monomers |
| N-vinyl caprolactam (NVC) |
| 2-hydroxyethyl methacrylate (HEMA) |
| Diacetone acrylamide (DAA) |
| Di-(ethylene glycol) methyl ether methacrylate (DEGMEM) |
| Poly(ethylene glycol) methacrylate (PEGM) |

In experiments shown in FIGS. 12A-G, 10 mol % of N',N'-methylene bisacrylamide, 10 mol % of potassium persulfate and 33 mol % of N,N,N',N'-tetramethylethylenediamine (TEMEDA), was used as crosslinker, initiator and catalyst, respectively.

Figure 13:
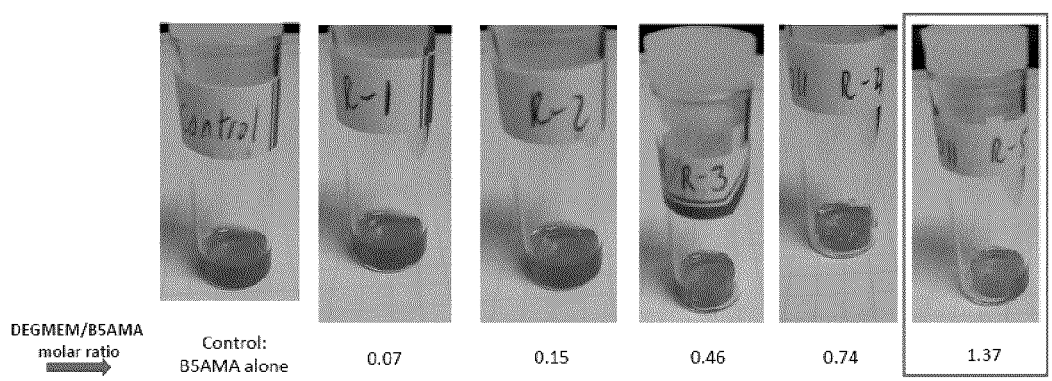
FIG. 13 is a series of photographs of hydrogels with various ratios of DEGMEM/B5AMA after water release.

Results obtained when di-(ethylene glycol) methyl ether methacrylate (DEGMEM) co-monomer was used at DEGMEM/B5AMA molar ratio of 1.37 show a water release almost 10 times more water than B5AMA hydrogels alone. In addition, the water recycling efficacy of gels was tested at least six times without any significant loss of gel integrity or water recycling efficacy. The diameter of the gels was reduced to almost 15% upon water release and the gel was found to restore to its original shape upon swelling (FIG. 13).

The use of different crosslinkers may affect the flexibility and pore sizes of the gel, which may affect its water recycling properties.

In this example, hydrogels comprising cross-linked co-polymer from B5AMA and one of a number of different monomers was studied. A variety of interesting hydrogels were generated. In particular, hydrogels from B5AMA and DEGMEME with cross-linking were identified as having particularly effective water harvesting properties.

Materials

Di(ethylene glycol) methyl ether methacrylate (DEGMEM), potassium persulfate (KPS), N,N,N',N'-tetramethylethylenediamine (TEMEDA), N,N'-methylenebisacrylamide (BIS), (R)-(−)-Pantolactone were purchased from Sigma-Aldrich. The vitamin B5 based monomer (B5AMA) was synthesized according to previously established procedure in Example 1.

Synthesis of B5AMA-DEGMEM Hydrogels

The B5AMA-DEGMEM hydrogels were prepared by free radical polymerization method. B5AMA (0.48M), DEGMEM (0.66M), crosslinker Bis (7% mol) and initiator KPS (7% mol) were dissolved in deionized water and the solution was degassing with ultrasonic bath for 5 minutes. Next, the catalyst TEMEDA was added (23% mol). The formation of hydrogels was confirmed by vial inversion test after 4-5 minutes. Prepared hydrogels leave overnight and then were washed three times with deionized water.

Water Release Measurements

Water-laden hydrogels were incubated at 37° C. for 24 hours period. After that, the water released was collected and weighted. Then, the gels were submersed in deionized water for 12 hours and the water release cycle started again.

Example 3—Hydrogel Preparation with Ent-B5AMA

In this example, preparation and studies of monomers and hydrogels based on the enantiomer of B5AMA, termed ent-B5AMA, were performed.

The optical activity of B5AMA and their corresponding pantolactone precursors using a polarimeter was studied. Data is depicted in Tables 4-6.

TABLE 4

Specific rotation of (S)-(+)-pantolactone and D-(−)-pantolactone

| Pantolactone | [α] |
|---|---|
| D-(−)-pantolactone | −49.9° |

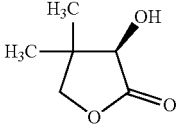

TABLE 4-continued

Specific rotation of (S)-(+)-pantolactone and D-(−)-pantolactone

| Pantolactone | [α] |
|---|---|
| (S)-(+)-pantolactone | +45.3° |

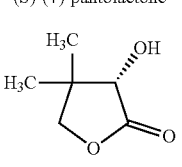

Synthesis of Ent-B5AMA Using (S)-(+)-Pantolactone

B5AMA and ent-B5AMA, with dextro and levorotary optical activities, and their corresponding hydrogels were prepared. Both types of hydrogels show water absorption and release behavior at 37° C.

ent-B5AMA refers to an enantiomer of B5AMA. ent-B5AMA was synthesized using the previously described procedure in Example 1, with the exception of using (S)-(+)-pantolactone in place of D-(−)-pantolactone. The specific rotation of B5AMA and ent-B5AMA are shown in Tables 5 and 6.

TABLE 5

Specific rotation of B5AMA samples

| B5AMA sample | [α] |
|---|---|
| DFC-007 (C = 0.248%) | +21.2° |
| DFC-014 (C = 0.248%) | +21.2° |
| DFC-025 (As prepared, C = 1.054%) | +14.9° |
| DFC-025 (Dried under vacuum, C = 1.03%) | +20.4° |
| DFC-025 (Dried under vacuum, C = 2.06%) | +15.3° |

TABLE 6

Specific rotation of ent-B5AMA sample

Figure 15:
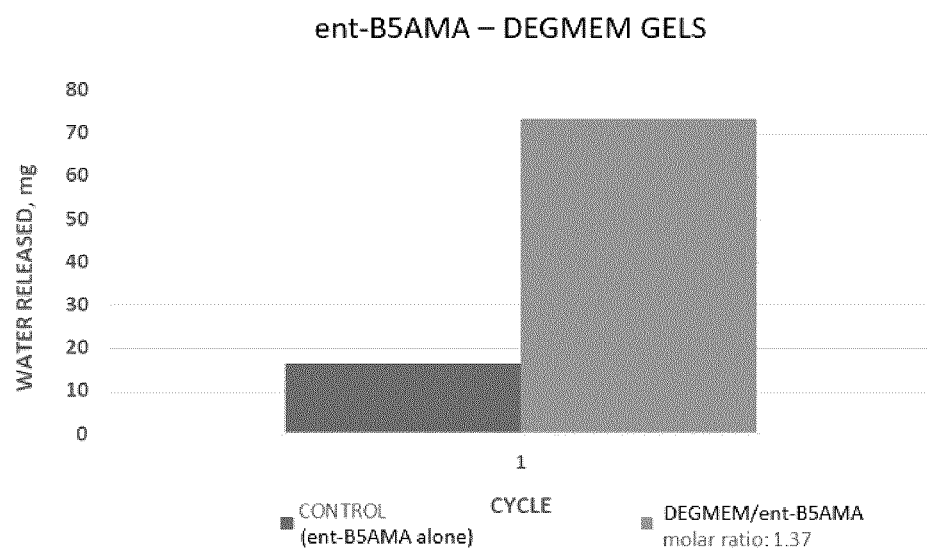
FIG. 15 is a bar graph depicting water release profiles (mg) of a hydrogels prepared with ent-B5AMA, or ent-B5AMA and DEGMEM as shown.

| ent-B5AMA sample | [α] |
|---|---|
| DFC-034 (C = 1.09%) | −4.8° | ent-B5AMA-DEGMEM hydrogels were prepared using previously described procedures. Data showing the water released from the hydrogels is depicted in FIG. 15.

Materials

Di(ethylene glycol) methyl ether methacrylate (DEGMEM), potassium persulfate (KPS), N,N,N',N'-tetramethylethylenediamine (TEMEDA), N,N'-methylenebisacrylamide (Bis), (R)-(−)-Pantolactone and (S)-(+)-Pantolactone were purchased from Sigma-Aldrich. The vitamin B5 based monomer (B5AMA) was synthesized according to previously established procedure in Example 1 using (R)-(−)-Pantolactone or (S)-(+)-Pantolactone, indistinctly.

Synthesis of Ent-B5AMA-DEGMEM Hydrogels

The ent-B5AMA-DEGMEM hydrogels were prepared by free radical polymerization method. ent-B5AMA (0.48M), DEGMEM (0.66M), crosslinker Bis (7% mol) and initiator KPS (7% mol) were dissolved in deionized water and the solution was degassing with ultrasonic bath for 5 minutes. Next, the catalyst TEMEDA was added (23% mol). The formation of hydrogels was confirmed by vial inversion test after 4-5 minutes. Prepared hydrogels leave overnight and then were washed three times with deionized water.

Water Release Measurements

Water-laden hydrogels were incubated at 37° C. for 24 hours period. After that, the water released was collected and weighted. Then, the gels were submersed in deionized water for 12 hours and the water release cycle started again.

One or more illustrative embodiments have been described by way of example. It will be understood to persons skilled in the art that a number of variations and modifications can be made without departing from the scope of the invention as defined in the claims.

REFERENCES

1. H. Kim, J. Kim, and S. J. Lee, *ACS Macro Lett.*, 2018, 7, 387.
2. P. A. Jacobson, C. C. Ilie, I. N. Yakovkin, M. Poulsen, D. S. Reddy, J. M. Takacs, P. and A. Dowben, *J. Phys. Chem. B*, 2006, 110, 15389.
3. K. Bethke, S. Palantöken, V. Andrei, M. Roß, V. S. Raghuwanshi, F. Kettemann, K. Greis, T. T. K. Ingber, J. B. Stuckrath, S. Valiyaveettil, and K. Rademann, *Adv. Funct. Mater.* 2018, 28, DOI: 10.1002/adfm.201800409.
4. D. K. Nandakumar, S. K. Ravi, Y. Zhang, N. Guo, C. Zhang, and S. C. Tan, *Energy & Environment. Sci.* 2018, 11, 2179.
5. Y. Deguchi, Y. Kohno, and H. Ohno, *Chemical Comm. (Camb.)* 2015, 51, 9287.
6. P. A. Kallenberger, and M. Froba, *Comm. Chem.* 2018, 1, DOI: 10.1038/s42004-018-0028-9.
7. K. Matsumoto, N. Sakikawa, and T. Miyata, *Nat. Comm.*, 2018, 9, 2315 doi: 10.1038/s41467-018-04810-8.
8. A. Teston, M. Geraldi, B. Colasio, and E. Gishi, *Water*, 2018, 10, DOI:10.3390/w10040471.
9. V. Gun'ko, I. Savina, and S. Mikhalovsky, *Gels*, 2017, 3, DOI: 10.3390/gels3040037.
10. G. S. Kelly, *Altern. Med. Rev.*, 2011, 16, 263.
11. M. N. Zholobak, A. B. Shcherbakov, A. S. Bograd-Kobelska, A. S. Ivanova, N. Y. Baranchikov, and V. K. Ivanov, *J. Photochem. PhotoBiol. B*, 2014, 130, 102.
12. L. Fan, Z. Cai, K. Zhang, F. Han, J. Li, C. He, X. Mo, X. Wang, and H. Wang, *Colloid. Surf B: Biointerfaces*, 2014, 117, 14.
13. M. de Villiers, C. Macuamule, C. Spry, Y. Hyun, E. Strauss, and K. J. Saliba, *ACS Med. Chem. Lett.* 2013, 4, 784.
14. T. O. Akinnusi, K. Vong, and K. Auclair, *Bioorg. Med. Chem.* 2011, 19, 2696.
15. G. Clifton, S. R. Bryant, and C. G. Skinner, *Arch. Biochem. Biophys.* 1970, 137, 523.
16. Z. Deng, H. Bouchékif, K. Babooram, A. Housni, N. Choytun, and R. Narain, *J. Polym. Sci. Part A: Polym. Chem.* 2008, 46, 4984.
17. N-T. Nguyen, and J-H. Liu, *Eur. Polym. J.* 2013, 49, 4201.
18. J. R. Witono, I. W. Noordergraaf, H. J. Heeres, and L. P. B. M. Janssen, *Carb. Polym.* 2014, 103, 325.
19. L. Passauer, M. Struch, S. Schuldt, J. Appelt, Y. Schneider, D. Jaros, and H. Rohm, *ACS App. Mater. Interfaces*, 2012, 4, 5852.
20. R. Mishra, M. Datt, and A. *AAPS Pharm. Sci. Tech.*, 2008, 9, 395.
21. N. Sanabria-DeLong, S. K. Agrawal, S. R. Bhatia, and G. N. Tew, *Macromolecules* 2006, 39, 1308.
22. J. Coates, *Encyclopedia of Analytical Chemistry*; R. A. Meyers, John Wiley & Sons, Ltd., 2000.
23. C. Gao, J. Ren, W. Kong, R. Sun, and Q. Chen, *RSC Advances* 2015, 5, 9671.
24. X. Huang, R. Wang, T. Lu, D. Zhou, W. Zhao, S. Sun, and C. Zhao, *Biomacromolecules*, 2016, 17, 4011.
25. T. Vermonden, R. Censi, and W. E. Hennink, *Chem. Rev.* 2012, 112, 2853.
26. E. V. Hackl, V. V. Khutoryanskiy, and I. Ermolina, *J. Appl. Polym. Sci.* 2017, 134, https://doi.org/10.1002/app.44768.
27. A. Kabir, M. J. Dunlop, B. Acharya, R. Bissessur and M. Ahmed, RSC Adv., 2018, 8, 38100, DOI: 10.1039/c8ra07915c.

All references cited herein and elsewhere in the specification are herein incorporated by reference in their entireties. In the event of conflicting information with statements between any reference to or incorporated herein, and the present disclosure, the present disclosure will act as the guiding authority.

The present invention has been described with regard to one or more embodiments. However, it will be apparent to persons skilled in the art that a number of variations and modifications can be made without departing from the scope of the invention as defined in the claims.

What is claimed is:

1. A compound of formula I:

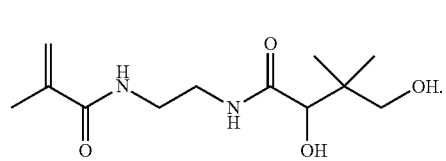

(formula I)

2. The compound of claim 1, which is the R enantiomer, S enantiomer, or any mixture thereof.

3. The compound of claim 1, which is:

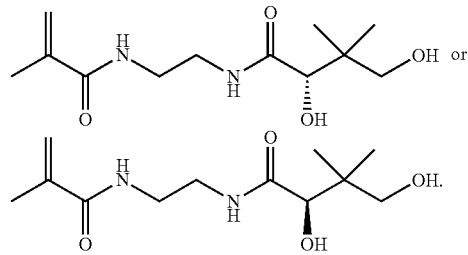

4. The compound of claim 1, which is B5AMA:

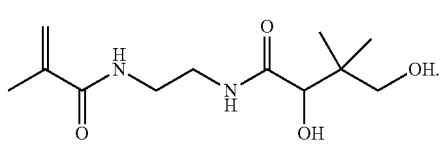

(formula I)

5. A polymer prepared by polymerization of one or more monomers, wherein at least one of the monomers is a compound of formula (I) as defined in claim 1.

6. The polymer of claim 5, wherein the polymer is a homopolymer, or a co-polymer, wherein the polymer is crosslinked by free radical polymerization of the one or more monomers in the presence of one or more crosslinkers.

7. The polymer of claim 5, wherein the one or more monomers are polymerized by free radical polymerization in the presence of an initiator, a crosslinker, and a catalyst.

8. The polymer of claim 7, wherein polymerization is in the presence of the cross-linker at about 10 mol %, the initiator at about 10 mol %, the catalyst at about 33 mol %, or any combinations thereof.

9. The polymer of claim 5, wherein the polymer is cross-linked with any one or more of the following cross-linkers:

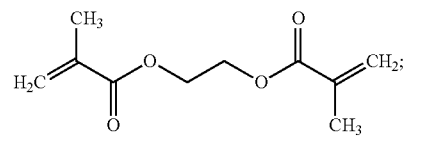

ethylene glycol dimethacrylate

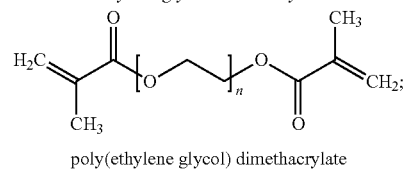

poly(ethylene glycol) dimethacrylate

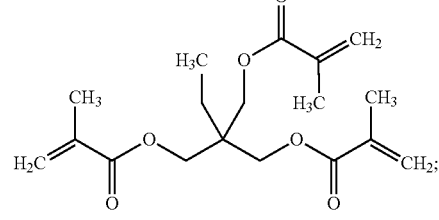

triethylene glycol dimethacrylate

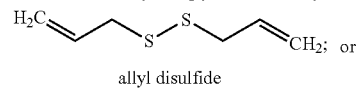

allyl disulfide

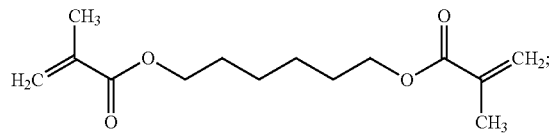

1,6-hexanediol dimethacrylate

N,N'-methylene bisacrylamide;
or any combinations thereof.

10. The polymer of claim 5, wherein at least one of the monomers is any one or more of:

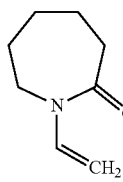

N-vinyl caprolactam

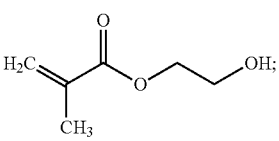

2-hydroxyethyl methacrylate

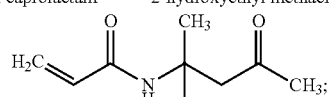

diacetone acrylamide

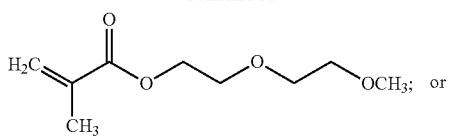

di-(ethylene glycol)methyl ether methacrylate
(DEGMEM)

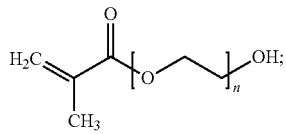

poly(ethylene glycol) methacrylate or any combinations thereof.

11. The polymer of claim 5, wherein a molar ratio of the other monomer or monomers to the monomer which is the compound of formula (I) is a value within a range of about 0.02 to about 2.

12. The polymer of claim 5, wherein the polymer is a co-polymer of DEGMEM and B5AMA monomers.

13. The polymer of claim 12, wherein a molar ratio of DEGMEM monomer to B5AMA monomer (DEGMEM/B5AMA) in the polymer is a value within a range of about 1.1 to 1.5.

14. A hygroscopic hydrogel comprising a cross-linked polymer, the polymer being prepared by polymerization of one or more monomers, wherein at least one of the monomers is a compound of formula I:

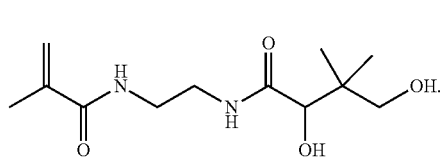

(formula I)

15. A hydrogel comprising formula II:

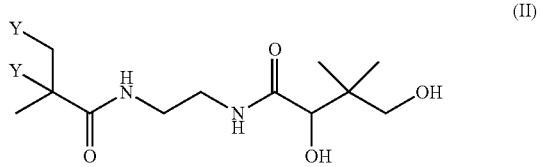

(II)

wherein each Y group is independently selected from the group consisting of: H,

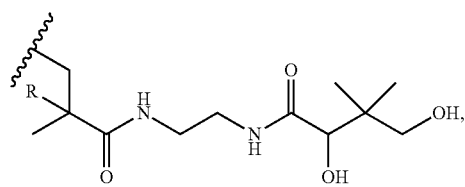

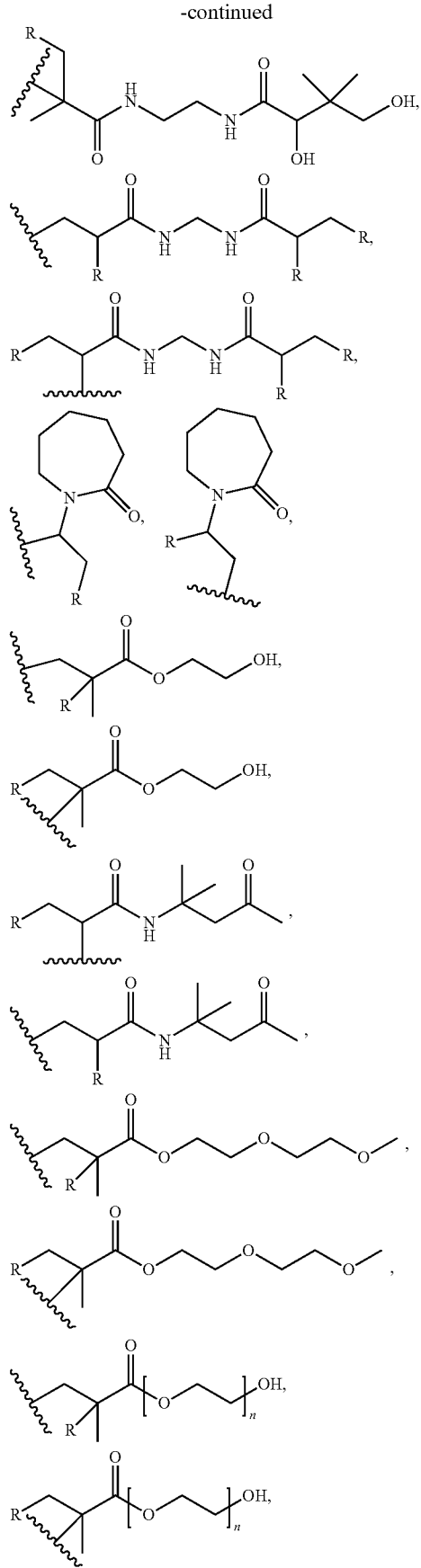
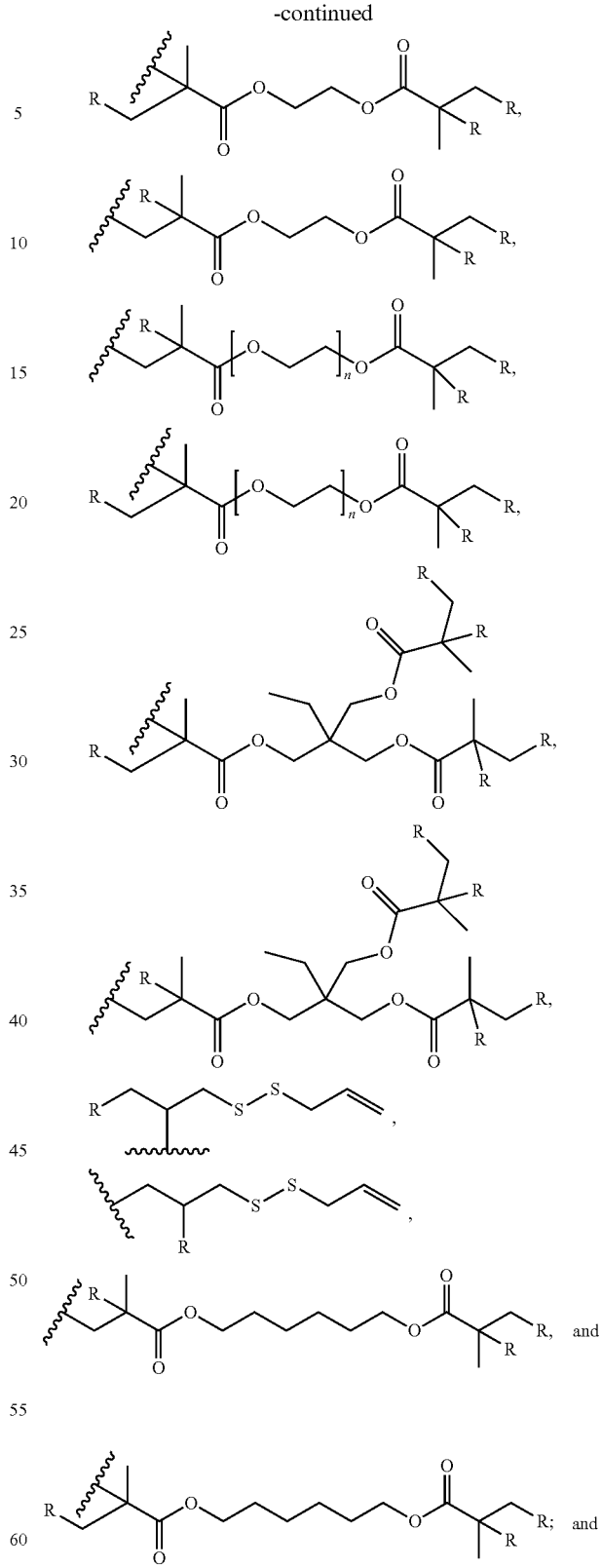
wherein each R represents a linkage to another Y selected from the group, so as to provide a matrix structure.
16. The hydrogel of claim 15, wherein each Y group is independently selected from the group consisting of: H,

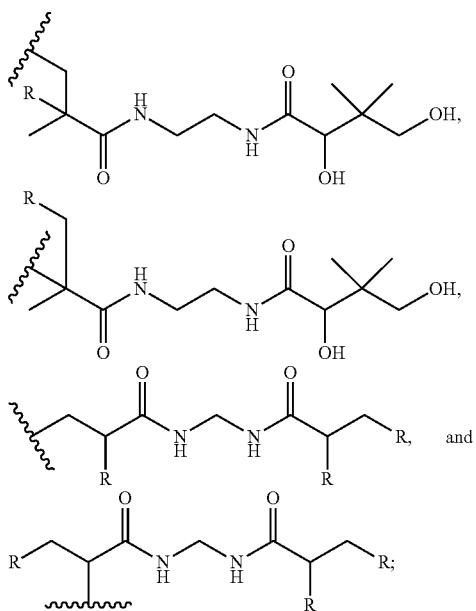

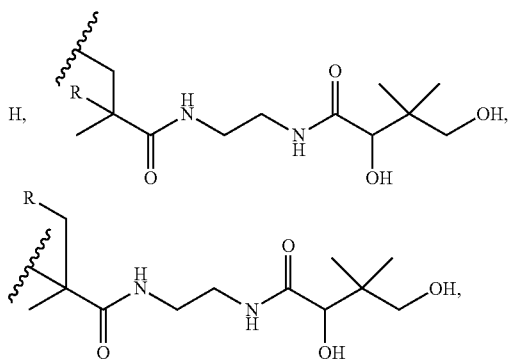

wherein each R represents a linkage to another Y selected from the group, so as to provide a matrix structure.

17. The hydrogel of claim 16, wherein the hydrogel comprises a polymer of B5AMA cross-linked with Bis.

18. The hydrogel of claim 15, wherein each Y group is independently selected from the group consisting of:

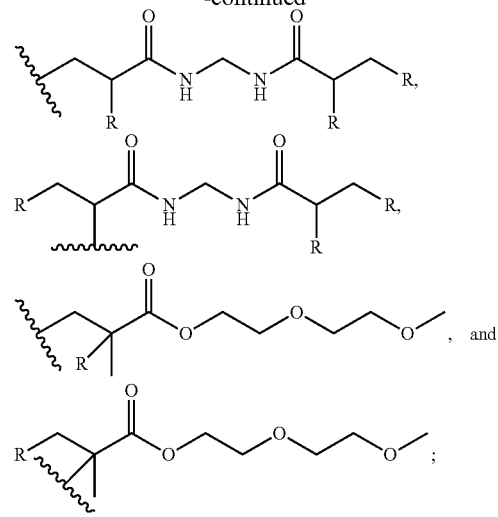

wherein each R represents a linkage to another Y selected from the group, so as to provide a matrix structure.

19. The hydrogel of claim 18, wherein the hydrogel comprises a co-polymer of B5AMA and DEGMEM, cross-linked with Bis.

20. The hydrogel of claim 15, comprising one or more of

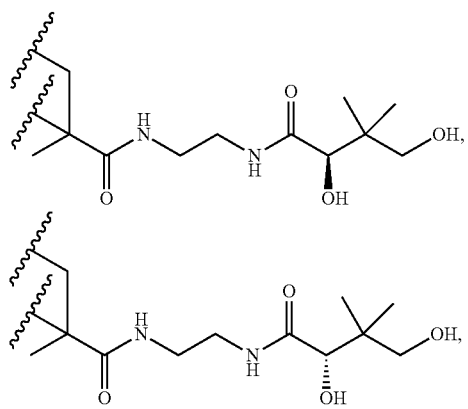

or a mixture thereof.

* * * * *